United States Patent
Takano et al.

(10) Patent No.: US 12,530,001 B2
(45) Date of Patent: Jan. 20, 2026

(54) MOTOR CONTROLLER AND MOTOR CONTROL METHOD FOR SHORTENING ADJUSTMENT TIME FOR ADJUSTING A MOTOR CONTROL COMMAND TO CONTROL A MOTOR

(71) Applicant: Mitsubishi Electric Corporation, Tokyo (JP)

(72) Inventors: Naoto Takano, Tokyo (JP); Masaya Kimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 562 days.

(21) Appl. No.: 17/633,215

(22) PCT Filed: Sep. 19, 2019

(86) PCT No.: PCT/JP2019/036715
§ 371 (c)(1),
(2) Date: Feb. 7, 2022

(87) PCT Pub. No.: WO2021/053784
PCT Pub. Date: Mar. 25, 2021

(65) Prior Publication Data
US 2022/0308531 A1    Sep. 29, 2022

(51) Int. Cl.
*G05B 13/02*    (2006.01)
*H02P 29/00*    (2016.01)

(52) U.S. Cl.
CPC .......... *G05B 13/0265* (2013.01); *H02P 29/00* (2013.01); *G05B 2219/33034* (2013.01)

(58) Field of Classification Search
CPC ...... G05B 13/0265; G05B 2219/33034; G05B 13/02; H02P 23/20; H02P 29/00
See application file for complete search history.

(56) References Cited

U.S. PATENT DOCUMENTS

2004/0150363 A1    8/2004    Toyozawa et al.
2015/0251312 A1    9/2015    Suzuki et al.
(Continued)

FOREIGN PATENT DOCUMENTS

CN        106815642 B       7/2018
JP        2004-227163 A     8/2004
(Continued)

OTHER PUBLICATIONS

International Search Report and Written Opinion mailed on Nov. 5, 2019, received for PCT Application PCT/JP2019/036715, Filed on Sep. 19, 2019, 9 pages including English Translation.
(Continued)

*Primary Examiner* — Rami R Okasha
(74) *Attorney, Agent, or Firm* — XSENSUS LLP

(57) ABSTRACT

A motor controller includes a drive control unit that drives a motor on the basis of a control command, operates a control target made up of the motor and a mechanical load, and performs an initialization operation of setting the control target in an initial state and an evaluation operation starting from the initial state. Further, there is a learning unit that determines the control command to be used in the evaluation operation, on the basis of the result of learning the control command used in the evaluation operation, and a state sensor signal in association with each other. Further, there is an adjustment management unit that determines, on the basis of the timing at which to perform a first process.

15 Claims, 14 Drawing Sheets

(56) References Cited

U.S. PATENT DOCUMENTS

| | | | |
|---|---|---|---|
| 2017/0111000 A1* | 4/2017 | Saito | H02P 27/06 |
| 2017/0153611 A1 | 6/2017 | Fujii et al. | |
| 2017/0154283 A1 | 6/2017 | Kawai et al. | |
| 2018/0292808 A1* | 10/2018 | Ikai | G05B 15/00 |
| 2018/0374001 A1* | 12/2018 | Namie | G05B 13/041 |
| 2019/0073437 A1* | 3/2019 | Amringer | G06F 30/20 |
| 2021/0011438 A1* | 1/2021 | Ueyama | G05B 13/041 |

FOREIGN PATENT DOCUMENTS

| | | |
|---|---|---|
| JP | 2010-9529 A | 1/2010 |
| JP | 2012-170214 A | 9/2012 |
| JP | 2015-168053 A | 9/2015 |
| JP | 2017-033979 A | 2/2017 |
| JP | 2017-102613 A | 6/2017 |
| JP | 2017-102619 A | 6/2017 |

OTHER PUBLICATIONS

Office Action mailed on Mar. 10, 2021, received for Taiwan Application 109131446, 11 pages including English Translation.

Office Action issued Apr. 30, 2024 in Korean Patent Application No. 10-2022-7007342, 14 pages.

Notice of Final Rejection mailed Jan. 15, 2025 in corresponding Korean Application No. 10-2022-7007342 (8 pages; with English translation).

Notice of Final Rejection mailed Nov. 27, 2025 in corresponding Korean Patent Application No. 10-2022-7007342 (9 pages; with English translation).

* cited by examiner

FIG.4
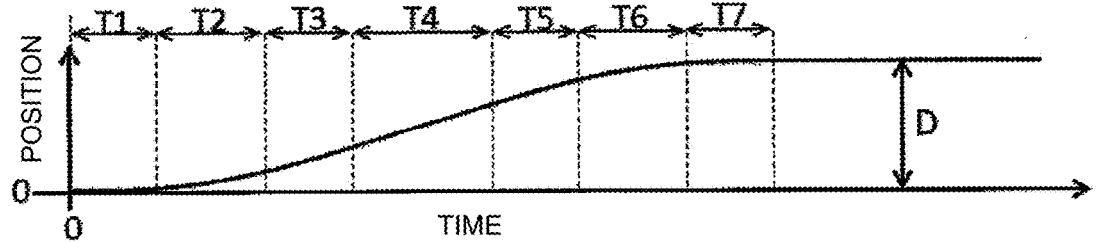
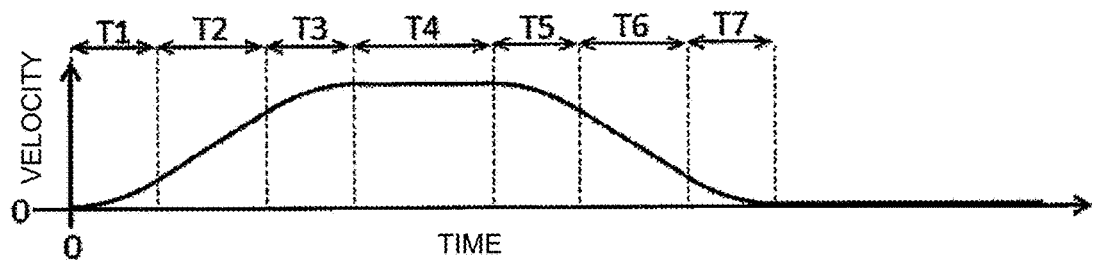
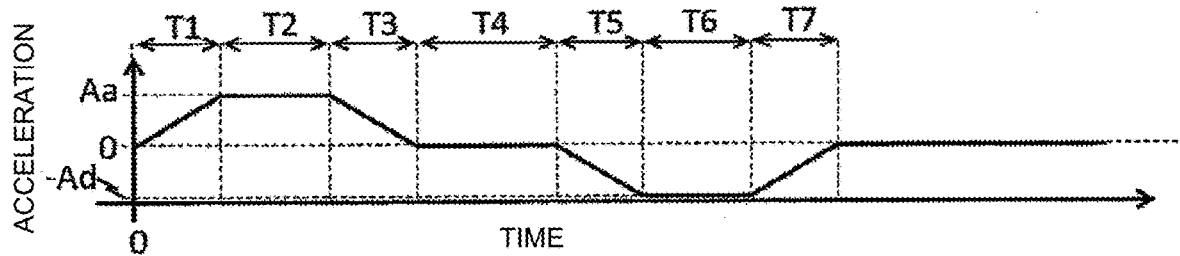
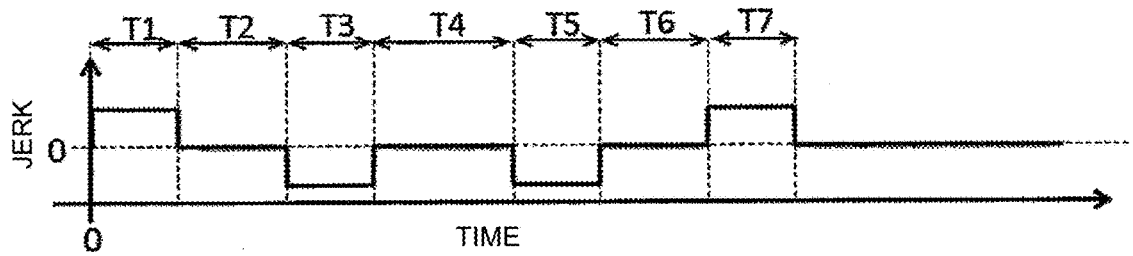

MOTOR CONTROLLER AND MOTOR CONTROL METHOD FOR SHORTENING ADJUSTMENT TIME FOR ADJUSTING A MOTOR CONTROL COMMAND TO CONTROL A MOTOR

CROSS-REFERENCE TO RELATED APPLICATION

The present application is based on PCT filing PCT/JP2019/036715, filed Sep. 19, 2019, the entire contents of which are incorporated herein by reference.

FIELD

The present invention relates to a motor controller that automatically adjusts a control command to control a motor.

BACKGROUND

Electronic component mounting equipment, semiconductor manufacturing equipment, etc. perform positioning control in which a motor is driven to move a machine such as a mounting head by a target distance. To shorten the time for positioning and improve the productivity of the equipment, the positioning control adjusts and sets, for example, parameters specifying a position trajectory, and control system parameters included in command signals to drive the motor.

The adjustment of these parameters, which sometimes requires trial and error, requires time and effort. An additional problem is that the time required for adjustment work and the results of the adjustment work depend on the knowledge and experience of the worker. A technique that automates parameter adjustment work has been proposed as a technique for solving the above-described problems.

A control parameter adjustment apparatus described in Patent Literature 1 includes a model update unit that updates a control-target model, using data when the control target is operated. The apparatus also includes a first search unit that searches for a control parameter in a first range to extract candidates for an optimum value by a repeat of simulations using the updated control-target model. The apparatus further includes a second search unit that allows the control target to operate repeatedly within a second range narrower than the first range, and acquires the results of the operation.

A machine learning device described in Patent Literature 2 includes a state observation unit that observes state variables of a motor driven and controlled by a motor controller. The device further includes a learning unit that learns conditions associated with amounts of correction used to correct commands of the motor controller in accordance with a training data set made up of the state variables.

CITATION LIST

Patent Literatures

Patent Literature 1: Japanese Patent Application Laid-open No. 2017-102619
Patent Literature 2: Japanese Patent Application Laid-open No. 2017-102613

SUMMARY

Technical Problem

Both the apparatus and the device described in Patent Literature 1 and Patent Literature 2 automate parameter adjustment work as a single evaluation operation of acquiring a sensor value when the motor is driven and a single calculation process using the sensor value acquired in the evaluation operation are alternatively repeated. The calculation process is simulation, learning, or the like. When the adjustment is performed repeating the evaluation operation provided by the driving of the motor and the calculation process as described above, in some case, there is a need for an initialization operation of setting the motor etc. in an initial state preceding the start of the evaluation operation. Such a case poses a problem of being difficult to shorten the time required for the automatic adjustment to adjust the control command to control the motor by repeating the initialization operation, the evaluation operation, and the learning operation when the automatic adjustment is performed.

The present invention has been made in view of the above. It is an object of the present invention to provide a motor controller capable of shortening the time required for automatic adjustment to adjust a control command to control a motor by repeating an initialization operation, an evaluation operation, and a learning operation when performing the automatic adjustment.

Solution to Problem

A motor controller according to the present invention comprising: a drive control unit to drive a motor on a basis of a control command, operate a control target made up of the motor and a mechanical load mechanically connected to the motor, and perform an initialization operation of setting the control target in an initial state and an evaluation operation starting from the initial state; a learning unit to learn the control command used in the evaluation operation, and a state sensor signal in association with each other, the state sensor signal having detected a state of the control target at a time of the evaluation operation, and to determine, on the basis of a result of the learning, the control command to be used in the evaluation operation to be performed after the evaluation operation in which the state sensor signal has been acquired; and an adjustment management unit to determine, on the basis of a timing at which to perform a first process, a timing at which to perform a second process, the first process being one of a learning operation, the initialization operation, and the evaluation operation, the learning operation being an operation of the learning unit, the second process being one of the learning operation, the initialization operation, and the evaluation operation.

Advantageous Effects of Invention

The present invention can provide the motor controller capable of shortening the time required for the automatic adjustment to adjust the control command to control the motor by repeating the initialization operation, the evaluation operation, and the learning operation when performing the automatic adjustment.

BRIEF DESCRIPTION OF DRAWINGS

FIG. 4 is a diagram illustrating an example of a command pattern according to the first embodiment.

DESCRIPTION OF EMBODIMENTS

Hereinafter, embodiments will be described in detail with reference to the drawings. Note that the embodiments described below are examples. The embodiments may be combined as appropriate for implementation.

First Embodiment

Figure 1:
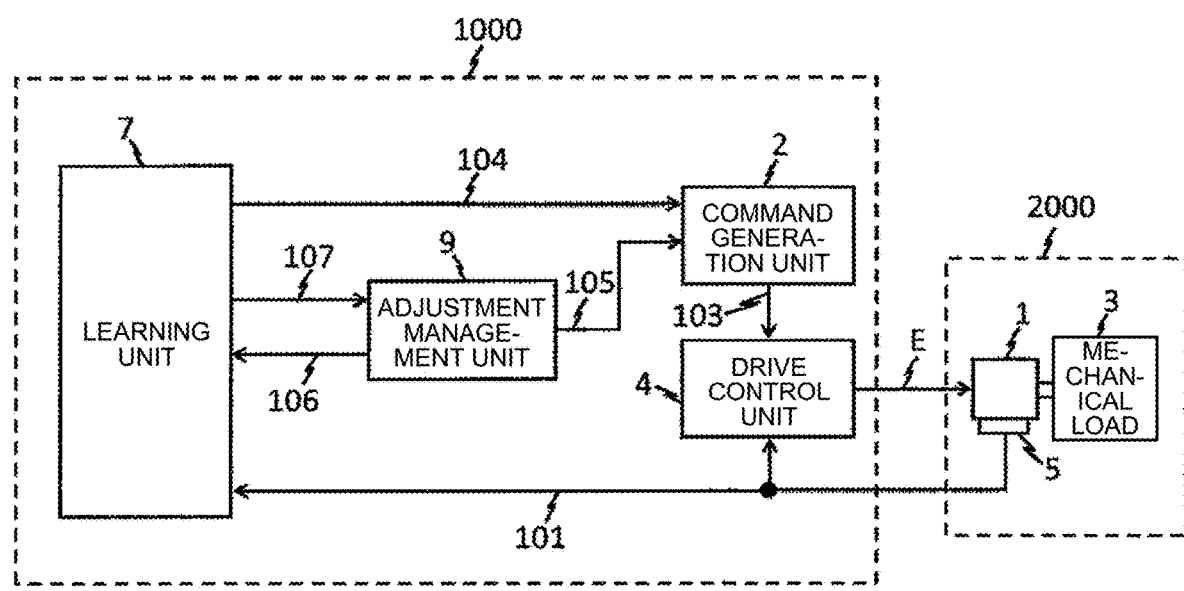
FIG. 1 is a block diagram illustrating an example of the configuration of a motor controller according to a first embodiment.

FIG. 1 is a block diagram illustrating an example of the configuration of a motor controller 1000 according to a first embodiment. The motor controller 1000 includes a drive control unit 4 and a command generation unit 2. The drive control unit 4 drives a motor 1 in such a manner that the motor 1 follows a command signal 103. The command generation unit 2 acquires a command parameter 104 and generates the command signal 103. The motor controller 1000 also includes a learning unit 7. The leaning unit 7 acquires a learning start signal 106 and a state sensor signal 101, and determines a learning completion signal 107 and the command parameter 104. The motor controller 1000 further includes an adjustment management unit 9. The adjustment management unit 9 acquires the learning completion signal 107, and determines the learning start signal 106 and a command start signal 105.

The motor 1 generates torque, thrust, or the like with drive power E output from the drive control unit 4. Examples of the motor 1 include a rotary servo motor, a linear motor, and a stepping motor. A mechanical load 3 is mechanically connected to the motor 1 and is driven by the motor 1. The motor 1 and the mechanical load 3 are referred to as a control target 2000. The mechanical load 3 can be any selected device that operates on, for example, torque, or thrust generated by the motor 1. The mechanical load 3 may be a device that performs positioning control. Examples of the mechanical load 3 include electronic component mounting equipment and semiconductor manufacturing equipment.

On the basis of the command signal 103, the drive control unit 4 supplies the drive power E to the motor 1 to drive the motor 1 for allowing the motor 1 to follow the command signal 103 to operate the control target 2000, thereby performing an evaluation operation and an initialization operation. The command signal 103 may be at least one of the position, velocity, acceleration, current, torque, or thrust, of the motor 1. The initialization operation is an operation of setting the control target 2000 in an initial state. The evaluation operation is an operation starting from the initial state. The state sensor signal 101 acquired at the time of the evaluation operation is used in a learning operation as will be described later. The drive control unit 4 can be configured to allow the position of the motor 1 to follow the command signal 103. For example, a feedback control system may be used which calculates the torque or current of the motor 1 on the basis of PID control so that the difference between the position of the motor 1 detected and the command signal 103 becomes small. The drive control unit 4 may employ a two-degree-of-freedom control system in which feedforward control is added to feedback control to drive the motor 1 such that the detected position of the mechanical load 3 follows the command signal 103.

The command generation unit 2 generates the command signal 103 on the basis of the command parameter 104. The command generation unit 2 generates the command signal 103 in accordance with a timing indicated by the command start signal 105. The motor 1 starts an operation at the timing when the command generation unit 2 generates the command signal 103. Thus, the motor 1 starts an operation in accordance with a timing indicated by the command start signal 105. That is, the motor 1 starts an operation in accordance with the command start signal 105. The evaluation operation or the initialization operation is herein referred to as an operation. The initialization operation and the evaluation operation are performed, following their command signals 103. The command signals 103 for the initialization operation and the evaluation operation are generated on the basis of the command parameters 104 used in the respective operations. An operation example of the command generation unit 2 will be described later with reference to FIG. 4.

A state sensor 5 outputs, as the state sensor signal 101, a state quantity of at least one of the motor 1 or the mechanical load 3, that is, a result of detection of a state quantity of the control target 2000. Examples of the state quantity include the position, velocity, acceleration, current, torque, and thrust, of the motor 1. Further, examples of the state quantity include the position, velocity, and acceleration, of the mechanical load 3. Examples of the state sensor 5 include an encoder, a laser displacement meter, a gyroscope sensor, an acceleration sensor, a current sensor, and a force sensor. The state sensor 5 in FIG. 1 will be described as an encoder that detects the position of the motor 1 as the state quantity.

The learning unit 7 learns the command parameter 104 used in the evaluation operation, in association with the state sensor signal 101 that has detected the state of the control target 2000 at the time of the evaluation operation. Then, the learning unit 7 determines the command parameter 104 to be used in the subsequent evaluation operation to be performed after the evaluation operation during which the learning unit 7 has acquired the state sensor signal 101. The operation of the learning unit 7 from the start of the learning to the determination of the command parameter 104 is referred to as a learning operation. The learning unit 7 starts the learning in accordance with the learning start signal 106. The learning start signal 106 is a signal indicating the start time of the learning operation and is determined by the adjustment management unit 9 as will be described later. The learning unit 7 further determines the learning completion signal 107. The learning completion signal 107 indicates the time at which the learning unit 7 determines the command parameter 104, that is, the learning completion signal 107 indicates the completion time of the learning operation. The detailed operation of the learning unit 7 will be described later with reference to FIGS. 5 and 6.

The adjustment management unit 9 determines, on the basis of the learning completion signal 107, the value of the command start signal 105 indicating the start time of the evaluation operation, thereby determining the start time of the evaluation operation on the basis of the completion time of the learning operation. In an operation example in FIG. 2, the adjustment management unit 9 determines, on the basis of the completion time of the evaluation operation, the learning start signal 106 indicating the start time of the learning operation and the command start signal 105 indicating the start time of the initialization operation. As will be described later, the adjustment management unit 9 can detect the completion time of the evaluation operation as the adjustment management unit 9 detects the lapse of a predetermined time period from the start time of the evaluation operation. In other words, the adjustment management unit 9 determines the start times of the learning operation and the initialization operation on the basis of the completion time of the evaluation operation.

Figure 2:
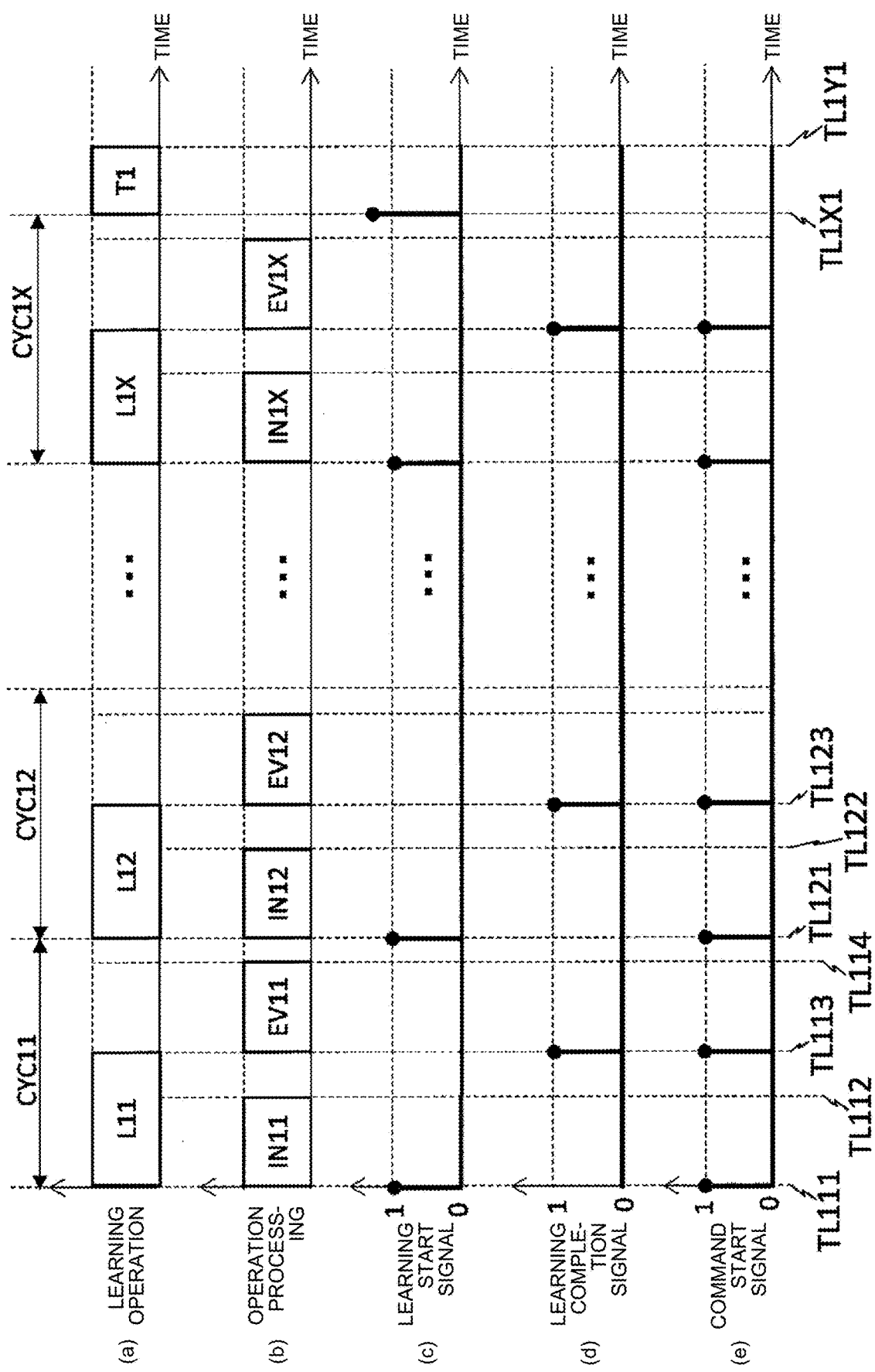
FIG. 2 is a diagram illustrating an example of operation timings in the motor controller according to the first embodiment.

FIG. 2 is a diagram illustrating an example of operation timings in the motor controller 1000 according to the first embodiment. The horizontal axes in FIGS. 2(*a*) to 2(*e*) represent time, and the vertical axes in FIGS. 2(*a*) to 2(*e*) represent the learning operation, operation processing (the initialization operation and the evaluation operation), the learning start signal 106, the learning completion signal 107, and the command start signal 105, respectively.

Description will be made as to the relationships between the values of the command start signal 105, the learning start signal 106, and the learning completion signal 107, and information indicated by the signals will be described. In FIG. 2, the motor 1 starts the operations at times when the value of the command start signal 105 becomes 1. The learning unit 7 starts the learning operation at times when the value of the learning start signal 106 becomes 1. The learning unit 7 determines that the value of the learning completion signal 107 at times when the learning operation is completed is 1. The values of the signals of the command start signal 105, the learning start signal 106, and the learning completion signal 107 become 1, after which these values may each be returned to 0 before an instruction to perform the next operation is given. Each of the above signals is not limited to the above signals as long as the signals indicate, for example, the start time, and the completion time of the operation.

The evaluation operation, the initialization operation, and the learning operation are referred to as processes. A cycle, which is referred to as a learning cycle, includes each process, i.e., each of the initialization operation, the evaluation operation, and the learning operation, at least once and is repeated periodically. The learning cycle in FIG. 2 includes each process once. The learning cycle in FIG. 2 includes a single initialization operation, a single evaluation operation, and a single learning operation. The command parameter 104 may be updated at each learning cycle. The motor controller 1000 repeats the learning cycle, thereby proceeding with learning. An adjustment operation of repeatedly performing the learning cycle to search for the command parameter 104 that provides an optimum operation of the control target 2000 is hereinafter referred to as automatic adjustment.

Figure 3:
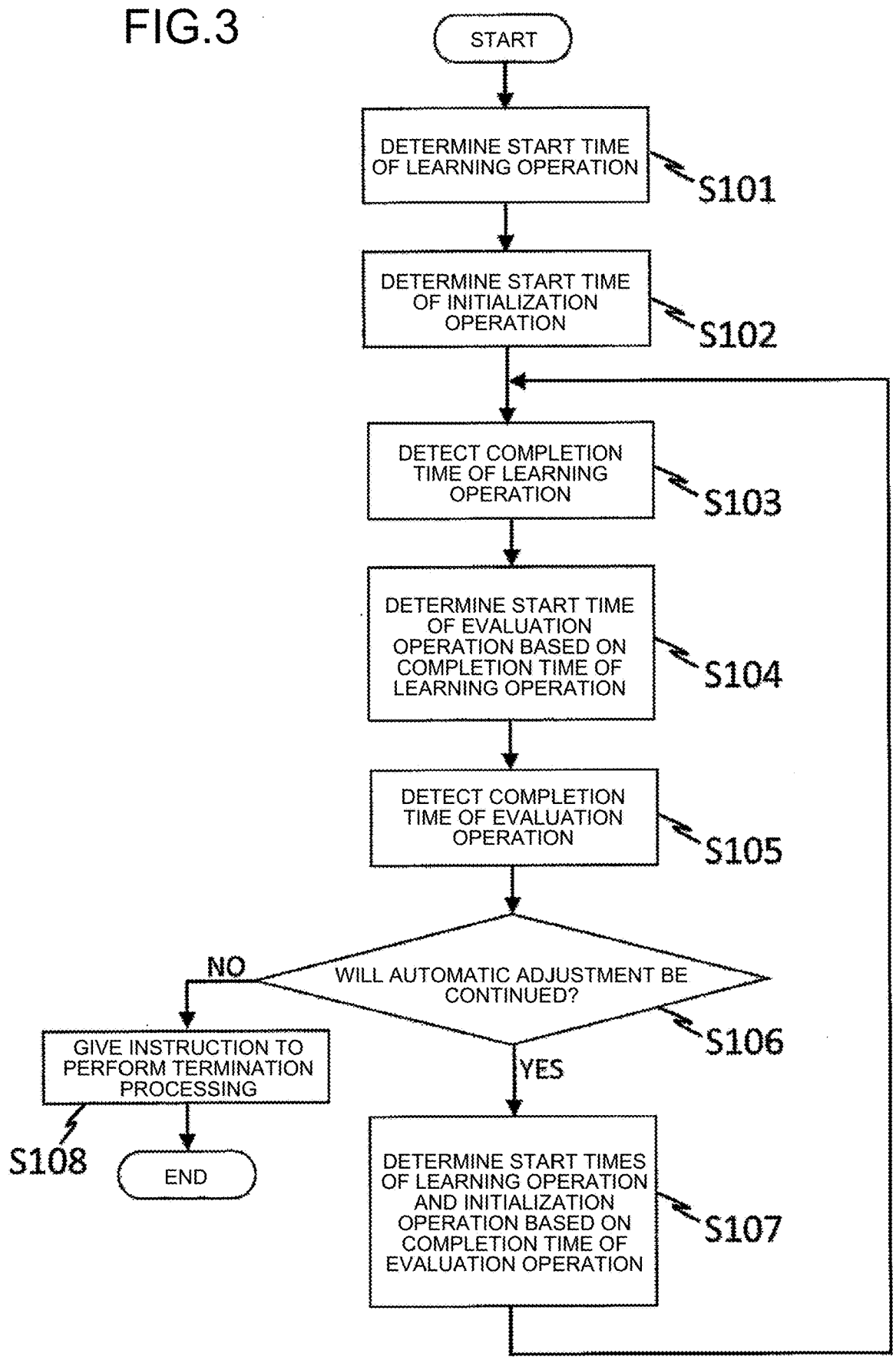
FIG. 3 is a flowchart illustrating an example of the operation of an adjustment management unit according to the first embodiment.

FIG. 3 is a flowchart illustrating an example of the operation of the adjustment management unit 9 according to the first embodiment. The operation of the motor controller 1000 will be illustrated with reference to FIGS. 2 and 3. Upon start of the automatic adjustment, the adjustment management unit 9, in step S101, determines that the value of the learning start signal 106 at a time TL111 is 1, and determines the start time of a learning operation L11. The learning unit 7 starts the learning operation L11 at the time TL111 in accordance with the learning start signal 106. When the learning unit 7 starts such a learning operation as the learning operation L11 without acquiring the state sensor signal 101 at the time of the evaluation operation after the start of the automatic adjustment, the learning unit 7 may randomly determine the command parameter 104. Alternatively, the determination may be made on the basis of a previous setting. In the case of the random determination, an action-value function Q as will be described later may be initialized with a random number, and the command parameter 104 that is an action $a_t$ may be randomly determined.

In step S102, the adjustment management unit 9 determines that the value of the command start signal 105 at the time TL111 is 1, and determines the start time of an initialization operation IN11. The motor 1 starts the initialization operation IN11 at the time TL111 in accordance with the command start signal 105. The initialization operation IN11 is performed in parallel with the learning operation L11. The phrase "performed in parallel" hereinafter means a state in which two processes are at least partly performed in a temporally overlapping manner. The time required for the initialization operation IN11 is shorter than the time required for the learning operation L11. Thus, the adjustment management unit 9 may delay the start time of the initialization operation IN11 beyond the start time of the learning operation L11 to the extent that a waiting time is not extended, that is, to the extent that the completion of the initialization operation IN11 is not later than the completion of the learning operation L11. The motor 1 completes the initialization operation IN11 at a time TL112 and enters a standby state after the completion of the initialization operation IN11. The motor 1 in the standby state may be controlled within a predetermined position range or may stop. Furthermore, supply of power may stop. Next, the learning unit 7 determines that the value of the learning completion signal 107 at a time TL113 that is the completion time of the learning operation is 1.

In step S103, the adjustment management unit 9 detects the time at which the value of the learning completion signal 107 has become 1, and detects the time TL113 as the completion time of the learning operation L11. In operation in step S103, the adjustment management unit 9 only needs to detect the completion time of the learning operation, and, for example, may detect the time at which the learning unit 7 outputs the command parameter 104. In step S104, the adjustment management unit 9 determines that the value of the command start signal 105 at the time TL113 is 1, on the basis of the time TL113 that is the completion time of the learning operation, and determines the start time of an evaluation operation EV11 (a first evaluation operation). The motor 1 starts the evaluation operation EV11 at the time TL113 in accordance with the command start signal 105. When the evaluation operation EV11 is completed at a time TL114, the motor 1 enters a standby state.

In step S105, the adjustment management unit 9 detects the lapse of a predetermined time period from the start time of the evaluation operation EV11, and detects a time TL121 as the completion time of the evaluation operation EV11. The predetermined time period is, herein, a time period equal to or longer than an estimated value of the time required for the evaluation operation EV11. Note that in the present embodiment, the time detected by the adjustment management unit 9 as the completion time of the evaluation operation EV11 is different from the time at which the evaluation operation EV11 is completed and the motor 1 stops. In step S106, the adjustment management unit 9 determines whether or not to continue the automatic adjustment. When the adjustment management unit 9 determines to continue the automatic adjustment, the process proceeds to step S107. When the adjustment management unit 9 determines not to continue the automatic adjustment, the process proceeds to step S108.

For a method of the determination in step S106, for example, the adjustment management unit 9 may determine to continue the automatic adjustment if the number of learning cycles having been performed during the automatic adjustment is smaller than a predetermined number. The adjustment management unit 9 may determine not to continue the automatic adjustment if the number is equal to the predetermined number. Furthermore, the adjustment management unit 9 may determine not to continue the automatic adjustment if the state sensor signal 101 acquired in the evaluation operation immediately before step S106 satisfies a predetermined criterion, and the adjustment management unit 9 may determine to continue the automatic adjustment if the predetermined criterion is not satisfied. The criterion of the state sensor signal 101 may, for example, require that the convergence time of a positioning operation described later with reference to FIG. 6 be less than or equal to a predetermined time period.

In step S106 performed at the time TL121, the adjustment management unit 9 determines to continue the automatic adjustment and proceeds to step S107. In step S107, the adjustment management unit 9 determines that the values of the learning start signal 106 and the command start signal 105 at the time TL121 are 1, on the basis of the time TL121 that is the completion time of the evaluation operation EV11. This operation determines each of the start times of a learning operation L12 (a first learning operation) and an initialization operation IN12 (a first initialization operation). The learning unit 7 and the motor 1 start the learning operation L12 and the initialization operation IN12 at the time TL121 in accordance with the learning start signal 106 and the command start signal 105, respectively. The period from the time TL111 to the time TL121 is referred to as a learning cycle CYC11.

Thereafter, steps S103 to S107 are repeatedly performed until the adjustment management unit 9 determines, in step S106, not to continue the automatic adjustment. Then, in step S103 in a learning cycle CYC12, the adjustment management unit 9 detects a time TL123 as the completion time of the learning operation L12. Then, in step S104 in the learning cycle CYC12, the adjustment management unit 9 determines that the start time of an evaluation operation EV12 (a second evaluation operation) is the time TL123, on the basis of the detected completion time of the learning operation L12.

At a time TL1X1, the adjustment management unit 9 performs step S106 in a learning cycle CYC1X. The adjustment management unit 9 determines not to continue the automatic adjustment and proceeds to step S108. In step S108, the adjustment management unit 9 determines that the value of the learning start signal at the time TL1X1 is a value larger than 1, and instructs the learning unit 7 to perform termination processing T1. The instruction to perform the termination processing T1 only needs to indicate, to the learning unit 7, the start time of the termination processing. For example, the value of the learning start signal 106 at the time of giving an instruction to perform the termination processing may be determined to be a value other than 0 and 1, or another signal may be output to the learning unit 7 at the time of giving an instruction to perform the termination processing. The learning unit 7 detects the start time of the termination processing T1 and performs the termination processing T1.

In the termination processing T1, the learning unit 7 may determine the command parameter 104 that allow the control target 2000 to perform the best operation, that is, may determine the optimum command parameter 104, on the basis of the learning operation repeatedly performed in the automatic adjustment. The termination processing T1 will be described by way of example where the evaluation operation is a positioning operation of moving the control target 2000 by a target distance. First, of the command parameters 104 used in the evaluation operations in all the learning cycles, those in the evaluation operations in which a deviation that is the difference between the position of the motor 1 and the target travel distance has once fallen within a predetermined allowable range and then has not fallen outside the allowable range are selected. The command parameters 104 used in these evaluation operations are set as candidates for the optimum command parameter 104. Then, of the candidates of the command parameters 104, the command parameter 104 that has allowed the evaluation operation in which the deviation has fallen within the allowable range in the shortest time period from the start of the evaluation operation may be further selected and set as the optimum command parameter 104. The deviation will be described later with reference to FIG. 4.

The learning unit 7 may determine that a command parameter 104 that has not been used in the evaluation operations is the optimum command parameter 104. For example, from the command parameters 104 that have been used in the evaluation operations in all the learning cycles, the command parameters 104 that have allowed the operations in which the deviation has fallen within the allowable range within a predetermined time period are selected. Then, an average value of the selected command parameters 104 may be determined as the optimum command parameter 104. When the learning unit 7 completes the termination processing T1 at a time TL1Y1 in FIG. 2, the automatic adjustment is completed. Note that the termination processing T1 may be omitted. For example, the command parameter 104 that has been used in the evaluation operation EV1X may be determined as the optimum command parameter 104.

A first process and a second process are each one of the evaluation operation, the initialization operation, or the learning operation. The adjustment management unit 9 may determine the timing at which to perform the second process, on the basis of the timing at which to perform the first process. The timing at which to perform each of the first process and the second process may be the start time of that process or the completion time of the other process, or may be a time shifted from the start time or the completion time by a predetermined time period. By determining the timing at which to perform the second process on the basis of the timing at which to perform the first process, the interval between the two processes can be adjusted to be short, and a waiting time until the motor 1 or the learning unit 7 starts the process can be shortened.

Description will be made as to the relationships between the processes in the operation example in FIG. 2. In the operation example in FIG. 2, the next evaluation operation is performed using the command parameter 104 determined in the learning operation, and the next learning operation is performed using the state sensor signal 101 obtained as a result of the evaluation operation. Thus, the learning operation and the evaluation operation are not performed in parallel. Further, the evaluation operation and the initialization operation are not performed in parallel since the single control target 2000 performs the evaluation operation and the initialization operation. On the other hand, the initialization operation and the learning operation do not interfere with each other, and thus can be performed in parallel. Furthermore, in the operation example illustrated in FIG. 2, the time required for the learning operation is longer than the time required for the initialization operation.

In the operation example in FIG. 2, on the basis of the completion time of the evaluation operation, the adjustment management unit 9 determines the learning start signal 106 indicating the start time of the learning operation and the command start signal 105 indicating the start time of the initialization operation. The learning operation L12 and the initialization operation IN12 start at the completion time of the evaluation operation EV11 detected by the adjustment management unit 9, and the evaluation operation EV12 starts at the completion time of the learning operation L12. The present embodiment is not limited to this operation.

For example, the evaluation operation EV11 (the first evaluation operation), which is one of the evaluation operations, may be performed, the learning operation L12 may be performed using the state sensor signal 101 acquired at the time of the evaluation operation EV11, and further, the initialization operation IN12 may be performed in parallel with the learning operation L12. Then, on the basis of the command parameter 104 (a control command) determined in the learning operation L12, the evaluation operation EV12 (the second evaluation operation), which is the evaluation operation subsequent to the evaluation operation EV11, may be performed from the initial state set by the initialization operation IN12. Performing the processes as described above makes it possible to perform the initialization operation IN12 and the learning operation L11 in parallel, adjust the timings between the processes, and shorten the waiting time. The motor controller 1000 or the motor control method may be provided in this manner.

Further, for example, the adjustment management unit 9 may detect the completion time of the evaluation operation EV11, determine the start time of the learning operation L12 and the start time of the initialization operation IN12 on the basis of the detected completion time of the evaluation operation EV11, adjust the timings between the processes, and shorten the waiting time. Furthermore, for example, the adjustment management unit 9 may determine that the start time of one of the learning operation L12 and the initialization operation IN12, the one operation requiring a longer time, is the same as or precedes the start time of the other, and shorten the waiting time. Moreover, the adjustment management unit 9 may detect the completion time of one of the learning operation L12 or the initialization operation IN12, the one operation being completed at the same time as or later than the other, determine the start time of the evaluation operation EV12 on the basis of the detected completion time and shorten the waiting time. In the operation examples described above, when the start time of a next process is determined on the basis of the completion time of a process, it is preferable to shorten the interval between the completion time of the previous process and the start time of the next process to the extent possible. It is more preferable to determine that the completion time and the start time are the same or substantially the same.

The adjustment management unit 9 detects the completion time of the learning operation L11 by detecting the lapse of a predetermined time period from the start time of the learning operation L11, but the present embodiment is not limited to this mode. For example, there is a case where the first process and the second process, which are two processes, are performed, and an intermediate process including at least one of the initialization operation, the evaluation operation, or the learning operation is performed between the completion of the first process and the start of the second process. In this case, the adjustment management unit 9 may estimate the time required for the intermediate process in advance, and determine that the start time of the second process follows the time at which the estimated time required to perform the intermediate process has elapsed from the completion time of the first process. Through this operation, the start time of the second process may be adjusted with the estimated value of the time required for the intermediate process as a guide, and the waiting time is shortened to thereby reduce the time required for the automatic adjustment. Further, as in the operation example described with reference to FIG. 2, the adjustment management unit 9 may detect the completion time of the learning operation more accurately, using the learning completion signal 107 and accurately determine the timing at which to start the next process. Thus, the waiting time may be shortened.

Next, the operation of the command generation unit 2 to generate the command signal 103 on the basis of the command parameter 104 will be described. FIG. 4 is a diagram illustrating an example of a command pattern according to the first embodiment. The command pattern is a pattern indicating the command value of the motor 1 in time series. The command value of the command pattern is one of the position, velocity, acceleration, or jerk, of the motor 1. The command value may be equal to the value of the command signal 103. In the operation example in FIG. 4, the command signal 103 illustrated in time series is the command pattern.

In the evaluation operation, the command parameter 104 specifies a command pattern together with an operating condition. In other words, when the command parameter 104 and the operating condition are specified, a command pattern is uniquely determined. The operating condition is a constraint on the operation of the motor 1 at the time of the evaluation operation, and is constant in the evaluation operation repeatedly performed during the automatic adjustment. On the other hand, the command parameter 104 can be updated at each learning cycle during the automatic adjustment. In the motor controller 1000 in FIG. 1, the command generation unit 2 generates the command signal 103 on the basis of the command parameter 104. As a result, the drive control unit 4 drives the motor 1 on the basis of the command parameter 104. Further, the drive control unit 4 may drive the motor 1 on the basis of the command pattern. As described above, when the command signal 103, the command parameter 104, or the command pattern is defined as the control command that is a command to control the motor 1, the drive control unit 4 drives the motor 1 on the basis of the control command.

The horizontal axes in FIGS. 4(*a*) to 4(*d*) represent time. The vertical axes in FIGS. 4(*a*) to 4(*d*) indicate the position, velocity, acceleration, and jerk, of the motor 1, respectively, which are the command signal 103. The velocity, the acceleration, and the jerk are a first derivative, a second derivative, and a third derivative, of the position of the motor 1, respectively. The points of intersection of the horizontal axes and the vertical axes represent a time 0 that is a command start time at which the evaluation operation starts on the horizontal axes. The operating condition in the operation example in FIG. 4 is that the target travel distance is D. That is, the position of the motor 1 is 0 at the start time 0 of the evaluation operation, and the position of the motor 1 is D at a time t=T1+T2+T3+T4+T5+T6+T7 that is the end time.

The command pattern in FIG. 4 is divided into a first section to a seventh section from the time 0 that is the command start time to the end time in this order. Letting n be a natural number of 1 to 7, the time length of an n-th section is referred to as an n-th time length Tn. In the operation example in FIG. 4, seven parameters of a first time length T1 to a seventh time length T7 are the command parameter 104. The magnitudes of the acceleration in the second section and the sixth section are Aa and Ad, respectively. These accelerations are constant within the sections. Note that the acceleration magnitude Aa and the acceleration magnitude Ad are dependent variables of the command parameters 104, and have no degree of freedom in setting.

The command signal 103 at a time t ($0 \leq t < T1$) in the first section can be calculated as follows. An acceleration A1, a velocity V1, and a position P1 are obtained by integrating the jerk, the acceleration A1, and the velocity V1, respectively, between the time 0 of the first section and the time t in the first section with respect to time. In the first section, the acceleration increases at a constant rate and reaches the acceleration magnitude Aa at the time T1. Thus, the jerk in the first section is a value obtained by dividing the acceleration magnitude Aa by T1. Thus, the acceleration A1, the velocity V1, and the position P1 can be calculated as in formulas (1) to (3), respectively.

[Formula 1]

$$A1(t) = \int_0^t \frac{Aa}{T1} d\tau \tag{1}$$

[Formula 2]

$$V1(t) = \int_0^t A1(\tau) d\tau \tag{2}$$

[Formula 3]

$$P1(t) = \int_0^t P1(\tau) d\tau \tag{3}$$

The command signal 103 at a time t in the second section ($T1 \leq t < T1+T2$), that is, an acceleration A2, a velocity V2, and a position P2 can be calculated as in formulas (4) to (6) like those in the first section.

[Formula 4]

$$A2(t) = Aa \tag{4}$$

[Formula 5]

$$V2(t) = V1(T1) + \int_{T1}^t A2(\tau) d\tau \tag{5}$$

[Formula 6]

$$P2(t) = P1(T1) + \int_{T1}^t V2(\tau) d\tau \tag{6}$$

The command signal 103 at a time t in the third section ($T1+T2 \leq t < T1+T2+T3$), that is, an acceleration A3, a velocity V3, and a position P3 can be calculated as in formulas (7) to (9) like those in the first section.

[Formula 7]

$$A3(t) = Aa + \int_{T1+T2}^t \frac{-Aa}{T3} d\tau \tag{7}$$

[Formula 8]

$$V3(t) = V2(T1+T2) + \int_{T1+T2}^t A3(\tau) d\tau \tag{8}$$

[Formula 9]

$$P3(t) = P2(T1+T2) + \int_{T1+T2}^t V3(\tau) d\tau \tag{9}$$

The command signal 103 at a time t in the fourth section ($T1+T2+T35 \leq t < T1+T2+T3+T4$), that is, an acceleration A4, a velocity V4, and a position P4 can be calculated as in formulas (10) to (12) like those in the first section.

[Formula 10]

$$A4(t) = 0 \tag{10}$$

[Formula 11]

$$V4(t) = V3(T1+T2+T3) + \int_{T1+T2+T3}^t A4(\tau) d\tau \tag{11}$$

[Formula 12]

$$P3(t) = P3(T1+T2+T3) + \int_{T1+T2+T3}^t V4(\tau) d\tau \tag{12}$$

The command signal 103 at a time t in the fifth section ($T1+T2+T3+T4 \leq t < T1+T2+T3+T4+T5$), that is, an acceleration A5, a velocity V5, and a position P5 can be calculated as in formulas (13) to (15) like those in the first section.

[Formula 13]

$$A5(t) = \int_{T1+T2+T3+T4}^t \frac{-Aa}{T5} d\tau \tag{13}$$

-continued

[Formula 14]

$$V5(t) = V4(T1 + T2 + T3 + T4) + \int_{T1+T2+T3+T4}^{t} A5(\tau)d\tau \quad (14)$$

[Formula 15]

$$P5(t) = P4(T1 + T2 + T3 + T4) + \int_{T1+T2+T3+T4}^{t} V5(\tau)d\tau \quad (15)$$

The command signal 103 at a time t in the sixth section (T1+T2+T3+T4+T5≤t<T1+T2+T3+T4+T5+T6), that is, an acceleration A6, a velocity V6, and a position P6 can be calculated as in formulas (16) to (18) like those in the first section.

[Formula 16]

$$A6(t) = -Ad \quad (16)$$

[Formula 17]

$$V6(t) = V5(T1+T2+T3+T4+T5) + \int_{T1+T2+T3+T4+T5}^{t} A6(\tau)d\tau \quad (17)$$

[Formula 18]

$$P6(t) = P5(T1+T2+T3+T4+T5) + \int_{T1+T2+T3+T4+T5}^{t} V6(\tau)d\tau \quad (18)$$

The command signal 103 at a time t in the seventh section (T1+T2+T3+T4+T5+T6≤t≤T1+T2+T3+T4+T5+T6+T7), that is, an acceleration A7, a velocity V7, and a position P7 can be calculated as in formulas (19) to (21) like those in the first section.

[Formula 19]

$$A7(t) = -Ad \int_{T1+T2+T3+T4}^{t} \frac{Ad}{T7} d\tau \quad (19)$$

[Formula 20]

$$V7(t) = V6(T1 + T2 + T3 + T4 + T5 + T6) + \int_{T1+T2+T3+T4+T5+T6}^{t} A7(\tau)d\tau \quad (20)$$

[Formula 21]

$$P7(t) = P6(T1 + T2 + T3 + T4 + T5 + T6) + \int_{T1+T2+T3+T4+T5+T6}^{t} V7(\tau)d\tau \quad (21)$$

At a time t=T1+T2+T3+T4+T5+T6+T7 that is the end time, the velocity V7 matches 0, and further, the position P7 matches the target travel distance D. Thus, formulas (22) and (23) hold true at the end time. The acceleration magnitude Aa in the second section and the acceleration magnitude Ad in the sixth section can be determined from formulas (22) and (23).

[Formula 22]

$$V7 = 0 \quad (22)$$

[Formula 23]

$$P7 = D \quad (23)$$

The above is the operation example of the command generation unit 2 that generates the command signal 103 on the basis of the command parameter 104 and the operating condition. In the first section, the third section, the fifth section, and the seventh section, the jerk has a non-zero constant value. That is, the first time length T1, the third time length T3, the fifth time length T5, and the seventh time length T7 each specify a period of time during which the jerk has the non-zero constant value. The non-zero constant value means a constant value larger than 0 or a constant value smaller than 0. In these sections, the magnitude of the jerk may be used as the command parameter 104 instead of the time length Tn. For example, when the magnitude of the jerk in the first section is defined as J1, the first time length T1 and the jerk J1 have a relationship as in formula (24).

[Formula 24]

$$J1 = \frac{Aa}{T1} \quad (24)$$

Determining that the time length of a section in which the jerk has a non-zero constant value is the command parameter 104 is equivalent to determining that the magnitude of the jerk in the section in which the jerk has the non-zero constant value is the command parameter 104. As in the above example, the command parameter 104 only needs to determine the command pattern in combination with the operating condition. As in the example described here, there may be a plurality of options about how to select the command parameter 104 even under the same operating condition. How to select the command parameter 104 is not limited to the way described in the present embodiment.

Figure 5:
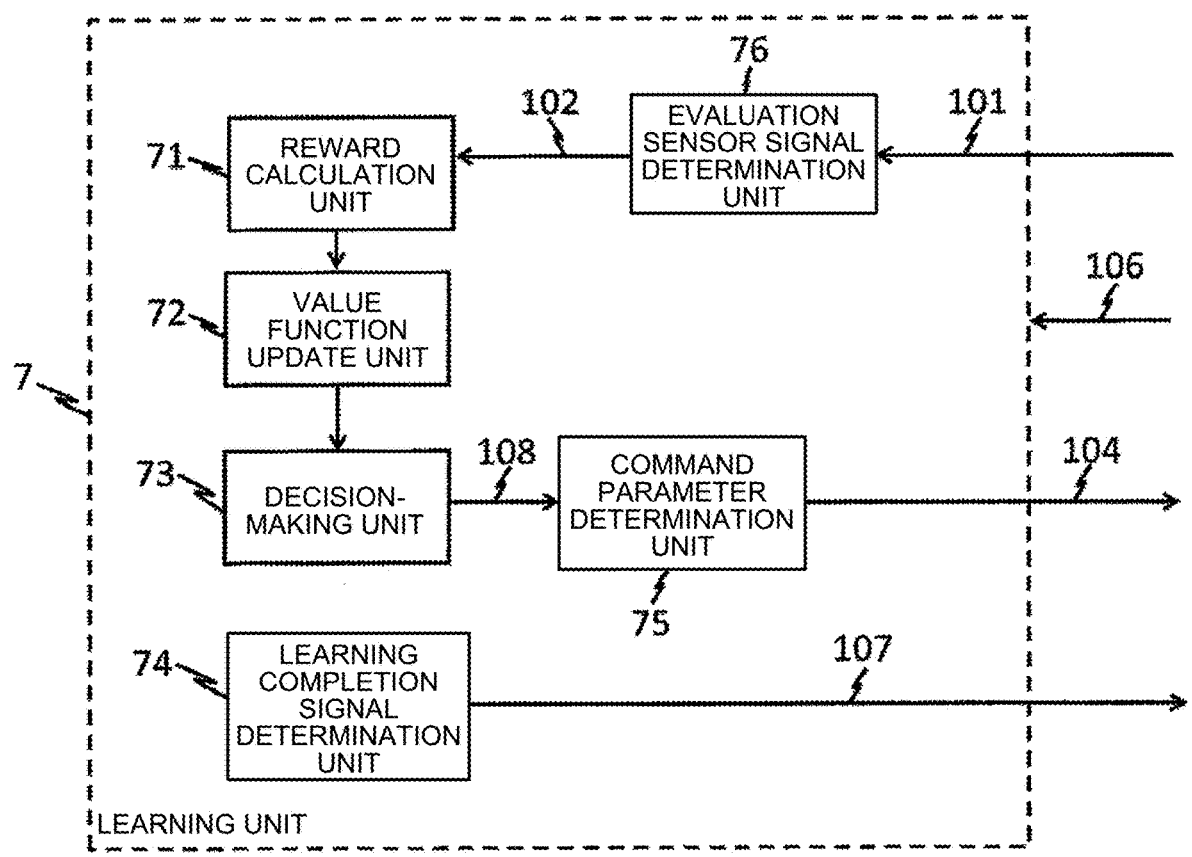
FIG. 5 is a block diagram illustrating an example of the configuration of a learning unit according to the first embodiment.

The learning unit 7 will be described. FIG. 5 is a block diagram illustrating an example of the configuration of the learning unit 7 according to the first embodiment. The learning unit 7 includes a reward calculation unit 71, a value function update unit 72, a decision-making unit 73, a learning completion signal determination unit 74, a command parameter determination unit 75, and an evaluation sensor signal determination unit 76. The reward calculation unit 71 calculates, on the basis of an evaluation sensor signal 102, a reward r for the command parameter 104 used in the evaluation operation. The value function update unit 72 updates an action-value function in accordance with the reward r. The decision-making unit 73 uses the action-value function updated by the value function update unit 72 to determine an evaluation candidate parameter 108 that is a candidate for the command parameter 104 to be used in the evaluation operation. On the basis of the evaluation candidate parameter 108, the command parameter determination unit 75 determines the command parameter 104 to be used in the evaluation operation. The evaluation sensor signal determination unit 76 determines the evaluation sensor signal 102 from the state sensor signal 101 at the time of the evaluation operation. The decision-making unit 73 may determine the command parameter 104 instead of the evaluation candidate parameter 108, in which case the command parameter determination unit 75 may be omitted from the learning unit 7.

The learning unit 7 may learn the command signal 103 or the command pattern instead of the command parameter 104. Thus, the learning unit 7 may learn the control command. In this case, the learning unit 7 includes a control command determination unit instead of the command parameter determination unit 75. The control command determination unit determines, on the basis of the evaluation candidate parameter 108, the control command to be used in the evaluation operation. While each of the command pattern and the command signal 103 specifies the motion of the motor 1, a combination of the command parameter 104 and the operating condition specifies the motion of the motor 1. Thus, the amount of data is smaller when the learning unit 7 learns the command parameter 104 than when the learning unit 7 learns the command pattern or the command signal 103. When the learning unit 7 learns the command parameter 104, therefore, the calculation amount and the calculation time of the learning unit 7 can be reduced. That is, when the command parameter 104 is learned, the learning operation can be efficiently performed.

The evaluation sensor signal determination unit 76 may derive the evaluation sensor signal 102 by applying calculation processing such as extraction, conversion, calibration, and filtering to the state sensor signal 101. For example, a signal obtained by temporally extracting the state sensor signal 101 at the time of the evaluation operation from the entire state sensor signal 101 may be used as the evaluation sensor signal 102. In this case, the state sensor signal 101 between the start and the completion, of the evaluation operation may be extracted. In addition, the state sensor signal 101 from the completion of the evaluation operation until a predetermined time period has elapsed may be extracted to evaluate the influence of vibration immediately after the completion of the evaluation operation. In determining the evaluation sensor signal 102, the evaluation sensor signal determination unit 76 may be configured to calibrate the acquired state sensor signal 101 to thereby remove an offset. The evaluation sensor signal determination unit 76 may be configured to provide a low-pass filter for allowing the state sensor signal 101 to pass therethrough to thereby remove noise. Using these pieces of signal processing, the accuracy of the learning operation may be improved. The reward calculation unit 71 may be configured to calculate the reward r on the basis of the state sensor signal 101 and omit the evaluation sensor signal determination unit 76.

The learning unit 7 can perform learning using various learning algorithms. As an example, the present embodiment describes a case where reinforcement learning is applied. In reinforcement learning, an agent in a certain environment observes a current state and determines an action to take. The agent selects an action and receives a reward from the environment. Through a series of actions, the agent learns a policy that can obtain the most reward. As typical methods of reinforcement learning, Q-learning, TD-learning, etc. are known. For example, in Q-learning, a typical update formula of an action-value function Q(s, a) is expressed by formula (25). The update formula may be expressed by an action-value table.

[Formula 25]

$$Q(s_t,a_t) \leftarrow Q(s_t,a_t) + \alpha(r_{t+1} + \gamma \max Q(s_{t+1},a) - Q(s_t,a_t))$$ (25)

In formula (25), $s_t$ represents an environment at a time t, and $a_t$ represents an action at the time t. The action $a_t$ changes the environment to $s_{t+1}$. $r_{t+1}$ represents a reward given due to the environmental change, $\gamma$ represents a discount factor, and a represents a learning rate. The value of the discount factor $\gamma$ is in a range of more than 0 and 1 or less ($0<\gamma \leq 1$), and the value of the learning rate a is in a range of more than 0 and 1 or less ($0<\alpha \leq 1$). When Q-learning is applied, the action at is the determination of the command parameter 104. Practically, an action that determines the evaluation candidate parameter 108 may be the action at. The environment $s_t$ includes the operating condition, the initial position of the motor 1, etc.

Figure 6:
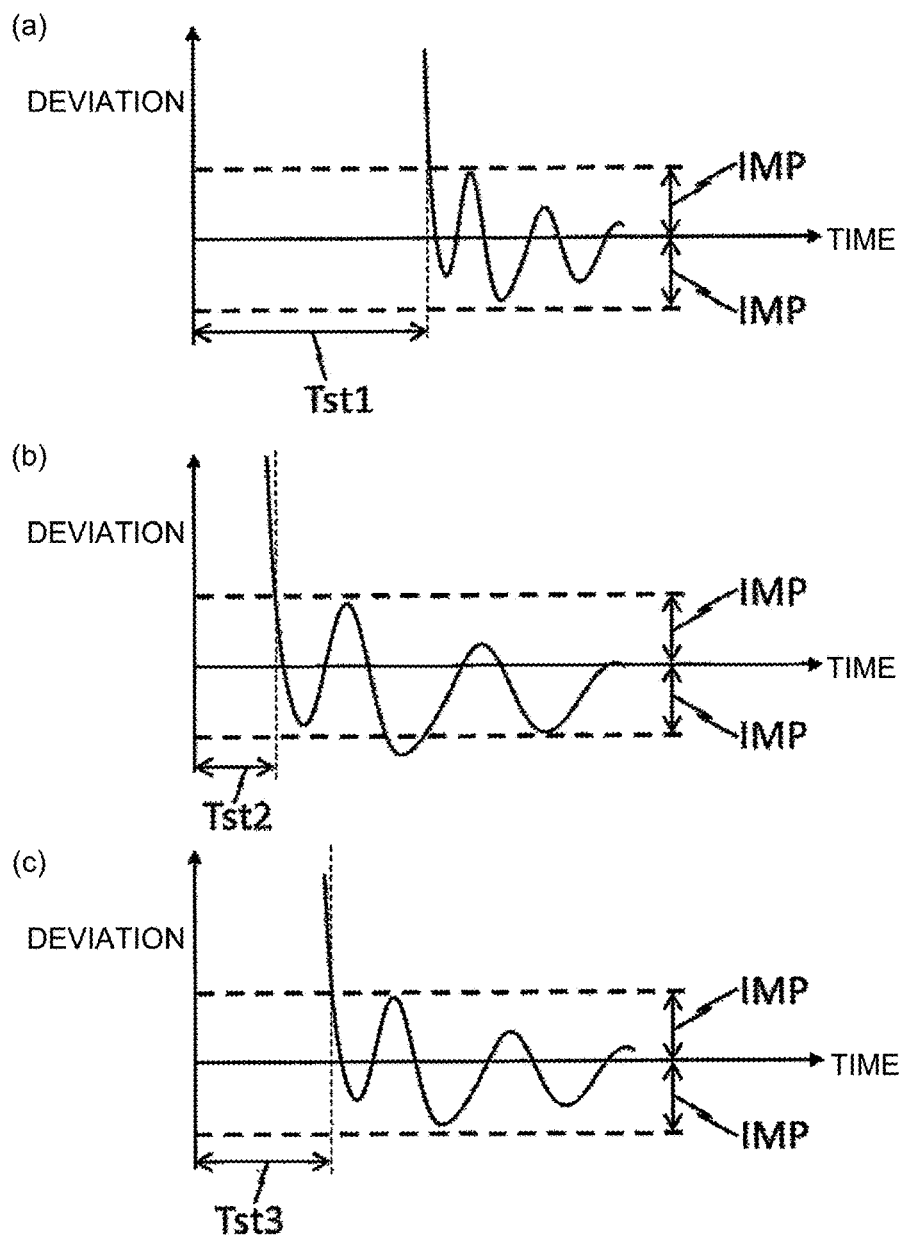
FIG. 6 is a diagram illustrating an example of time responses in deviation according to the first embodiment.

The operation of the reward calculation unit 71 will be described with reference to FIG. 6. FIG. 6 is a diagram illustrating an example of time responses in deviation according to the first embodiment. The deviation in FIG. 6 is the difference between the target travel distance and the position of the motor 1 when the motor 1 is operated in the evaluation operation. In FIG. 6, the horizontal axes represent time, and the vertical axes represent the deviation. The points of intersection of the vertical axes and the horizontal axes represent a time 0 at which the deviation is 0 on the vertical axes and which is the evaluation operation start time on the horizontal axes. In FIG. 6, an IMP represents a limit value of the allowable range of the deviation, and represents the magnitude of errors in operating accuracy allowed for the mechanical load 3.

The deviation in FIG. 6(a) falls within the allowable range by a time at which Tst1 elapses from the start of the evaluation operation, after which the deviation converges fluctuating within the allowable range. The deviation in FIG. 6(b) falls within the allowable range by a time at which Tst2 elapses from the start of the evaluation operation, after which the deviation temporarily falls outside the allowable range, and subsequently falls within the allowable range again. The deviation in FIG. 6(c) falls within the allowable range by a time at which a time Tst3 elapses from the start of the evaluation operation, after which the deviation converges fluctuating within the allowable range. The time Tst1, the time Tst2, and the time Tst3 have the relationships (Tst1>Tst3>Tst2) indicating that the value of the time Tst2 is smaller than the value of the time Tst3, and the value of the time Tst3 is smaller than the value of the time Tst1. The deviation in FIG. 6(c) converges faster than the deviations in FIGS. 6(a) and 6(b).

Changing the way for the reward calculation unit 71 to calculate the reward r makes it possible to select the optimum characteristic of the command parameter 104 obtained as a result of learning. For example, to learn the command parameter 104 that converges the deviation at a high speed, the reward calculation unit 71 may give a large reward r when the period of time from the start of the operation until the deviation falls within the allowable range is less than or equal to a predetermined time period. The shorter the period of time from the start of the operation until the deviation falls within the allowable range, the larger reward r may be given. The reward calculation unit 71 may calculate, as the reward r, the reciprocal of the period of time from the start of the evaluation operation until the deviation falls within the allowable range. When the deviation that has fallen within the allowable range falls outside the allowable range as in FIG. 3(b), a small reward r may be given so that the command parameter 104 that does not cause vibrations in the mechanical load 3 is learned. The above is the explanation of the operation example of the reward calculation unit 71 illustrated in FIG. 6.

When the reward r is calculated, the value function update unit 72 updates the action-value function Q in accordance with the reward r. The decision-making unit 73 determines, as the evaluation candidate parameter 108, the action $a_t$ that results in the largest updated action-value function Q, that is, the command parameter 104 that results in the largest updated action-value function Q.

The description of the motor controller 1000 illustrated in FIG. 1 is made giving an example where the learning algorithm used by the learning unit 7 is reinforcement learning. The learning algorithm in the present embodiment is not limited to reinforcement learning. A learning algorithm such as supervised learning, unsupervised learning, or semi-supervised learning may be applied. Further, deep learning to learn the extraction of features themselves may be used as the learning algorithm. Furthermore, machine learning may be performed in accordance with another method such as a neural network, genetic programming, functional logic programming, a support vector machine, or Bayesian optimization.

Figure 7:
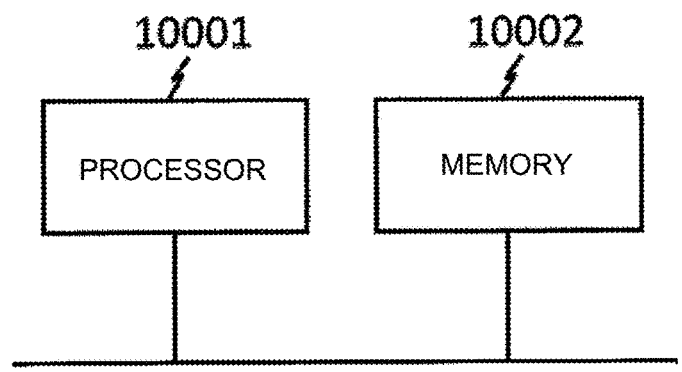
FIG. 7 is a diagram illustrating a configuration example when processing circuitry included in the motor controller according to the first embodiment consists of a processor and a memory.

FIG. 7 is a diagram illustrating a configuration example when processing circuitry included in the motor controller 1000 according to the first embodiment consists of a processor 10001 and a memory 10002. When the processing circuitry is made up of the processor 10001 and the memory 10002, the functions of the processing circuitry of the motor controller 1000 are implemented by software, firmware, or a combination of software and firmware. Software or firmware is described as programs and stored in the memory 10002. In the processing circuitry, the functions are implemented by the processor 10001 reading and executing the programs stored in the memory 10002. That is, the processing circuitry includes the memory 10002 for storing the programs that result in the execution of the processing in the motor controller 1000. These programs can be said to cause a computer to perform procedures and methods in the motor controller 1000.

The processor 10001 may be a central processing unit (CPU), a processing unit, an arithmetic unit, a microprocessor, a microcomputer, a digital signal processor (DSP), or the like. The memory 10002 may be nonvolatile or volatile semiconductor memory such as random-access memory (RAM), read-only memory (ROM), a flash memory, an erasable programmable ROM (EPROM), or an electrically EPROM (EEPROM) (registered trademark). The memory 10002 may be a magnetic disk, a flexible disk, an optical disk, a compact disk, a mini disk, a digital versatile disc (DVD), or the like.

Figure 8:
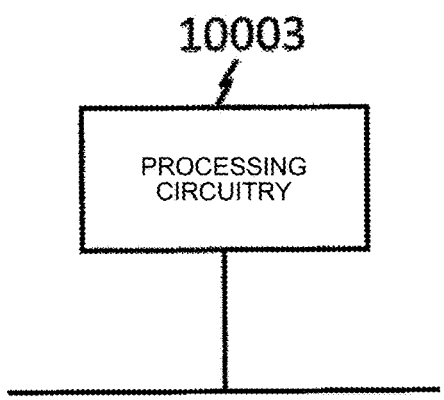
FIG. 8 is a diagram illustrating a configuration example when processing circuitry included in the motor controller according to the first embodiment is provided by dedicated hardware.

FIG. 8 is a diagram illustrating a configuration example when dedicated hardware provides processing circuitry included in the motor controller 1000 according to the first embodiment. When dedicated hardware provides the processing circuitry, processing circuitry 10003 illustrated in FIG. 8 may be, for example, a single circuit, a combined circuit, a programmed processor, a parallel-programmed processor, an application-specific integrated circuit (ASIC), a field-programmable gate array (FPGA), or a combination of them. The functions of the motor controller 1000 may be implemented by the processing circuitry 10003 on an individual function basis, or two or more of the functions may be collectively implemented by the processing circuitry 10003. The motor controller 1000 and the control target 2000 may be connected via a network. The motor controller 1000 may be located on a cloud server.

A plurality of control targets similar to the control target 2000 may be provided, and evaluation operations by the plurality of control targets may be performed in parallel to efficiently advance learning. For example, within the time period of the evaluation operation EV11 in FIG. 2, evaluation operations by the plurality of control targets are performed in parallel to acquire data including a plurality of sets of the command parameter and the evaluation sensor signal. Next, within the time period of the learning operation L12, the action-value function Q is updated a plurality of times using the data acquired within the time period of the evaluation operation EV11, to determine a plurality of command parameters. Further, within the time period of the evaluation operation EV12, evaluation operations by the plurality of control targets are performed using the plurality of command parameters determined within the time period of the learning operation L12. When the learning cycle is performed in this manner, a plurality of evaluation operations can be performed in parallel. For the operation of the learning unit to determine a plurality of command parameters, a method described later in a fourth embodiment may be used. While the learning cycle is repeated, some or all of the plurality of control targets may be changed, or the number of control targets that are the plurality of control targets may be increased or decreased.

The motor controller 1000 that has performed learning using data acquired from the control target 2000 may be connected to another object of control, and further perform learning using data acquired from the other object of control. The motor controller may be configured using a learned learning device that includes the results of the learning according to the present embodiment. The learned learning device may be implemented by a learned program that determines the command parameter 104 using the action-value function Q that has been updated through learning. Further, the learned learning device may be implemented by learned data in which the result of adjustment of the command parameter 104 is held. According to the motor controller using the learned learning device, it is possible to provide a motor controller that can use learning results in a short time. By the method described in the present embodiment, the command parameter 104 of the motor controller may be automatically adjusted or the motor controller may be manufactured. The automatic adjustment according to the present embodiment only needs to be automated in at least part of the adjustment work, and does not exclude human operation or human involvement.

As described above, the motor controller 1000 according to the present embodiment includes the drive control unit 4, the learning unit 7, and the adjustment management unit 9. The drive control unit 4 drives the motor 1 on the basis of the command parameter 104 (the control command) to operate the control target 2000 made up of the motor 1 and the mechanical load 3 mechanically connected to the motor 1. Then, the drive control unit 4 performs the initialization operation of setting the control target 2000 in the initial state and the evaluation operation starting from the initial state. The learning unit 7 learns the command parameter 104 (the control command) and the state sensor signal 101 in association with each other, the command parameter 104 being used in the evaluation operation, the state sensor signal 101 having detected the state of the control target 2000 at the time of the evaluation operation. Then, on the basis of the result of the learning, the learning unit 7 determines the command parameter 104 (the control command) to be used in the evaluation operation to be performed after the evaluation operation in which the state sensor signal 101 has been acquired. On the basis of the timing at which to perform the first process that is one of the initialization operation, the evaluation operation, and the learning operation, the adjustment management unit 9 determines the timing at which to perform the second process that is one of the initialization operation, the evaluation operation, and the learning operation. Thus, the timings at which the first process and the second process are performed can be adjusted to shorten the waiting time to efficiently perform the adjustment of the command parameter 104 (the control command).

The motor control method according to the present embodiment drives the motor 1 on the basis of the command parameter 104 (the control command) to operate the control target 2000 made up of the motor 1 and the mechanical load 3 mechanically connected to the motor 1. Then, the method performs the initialization operation of setting the control target 2000 in the initial state and the evaluation operation starting from the initial state. Then, the method performs the learning operation of: learning the command parameter 104 and the state sensor signal 101 in association with each other, the command parameter 104 being used in the evaluation operation, the state sensor signal 101 having detected the state of the control target 2000 at the time of the evaluation operation; and, on the basis of the result of the learning, determining the command parameter 104 to be used in the evaluation operation to be performed after the evaluation operation in which the state sensor signal 101 has been acquired. The learning operation is an operation between the start of the learning and the determination of the command parameter 104. Then, on the basis of the timing at which to perform the first process that is one of the learning operation, the initialization operation, and the evaluation operation, the timing at which to perform the second process that is one of the learning operation, the initialization operation, and the evaluation operation is determined. The motor control method capable of efficiently performing the automatic adjustment in this manner may be provided.

The timing at which to perform the second process may be the same as or follow the timing at which to perform the first process. As a result, the timing at which to perform the detected first process can be used in determining the timing at which to perform the second process, thereby shortening the interval between the processes more reliably. Even if the time required for the first process changes, for example, the timing at which to perform the second process can be adjusted in response to the change. It is preferable to shorten the interval between the completion time of the first process and the start time of the second process to the extent possible. It is more preferable to determine that the completion time of the first process and the start time of the second process are the same or substantially the same.

Thus, the present embodiment can provide the motor controller capable of shortening the time required for the automatic adjustment to adjust the control command to control the motor by repeating the initialization operation, the evaluation operation, and the learning operation when performing the automatic adjustment.

Second Embodiment

Figure 9:
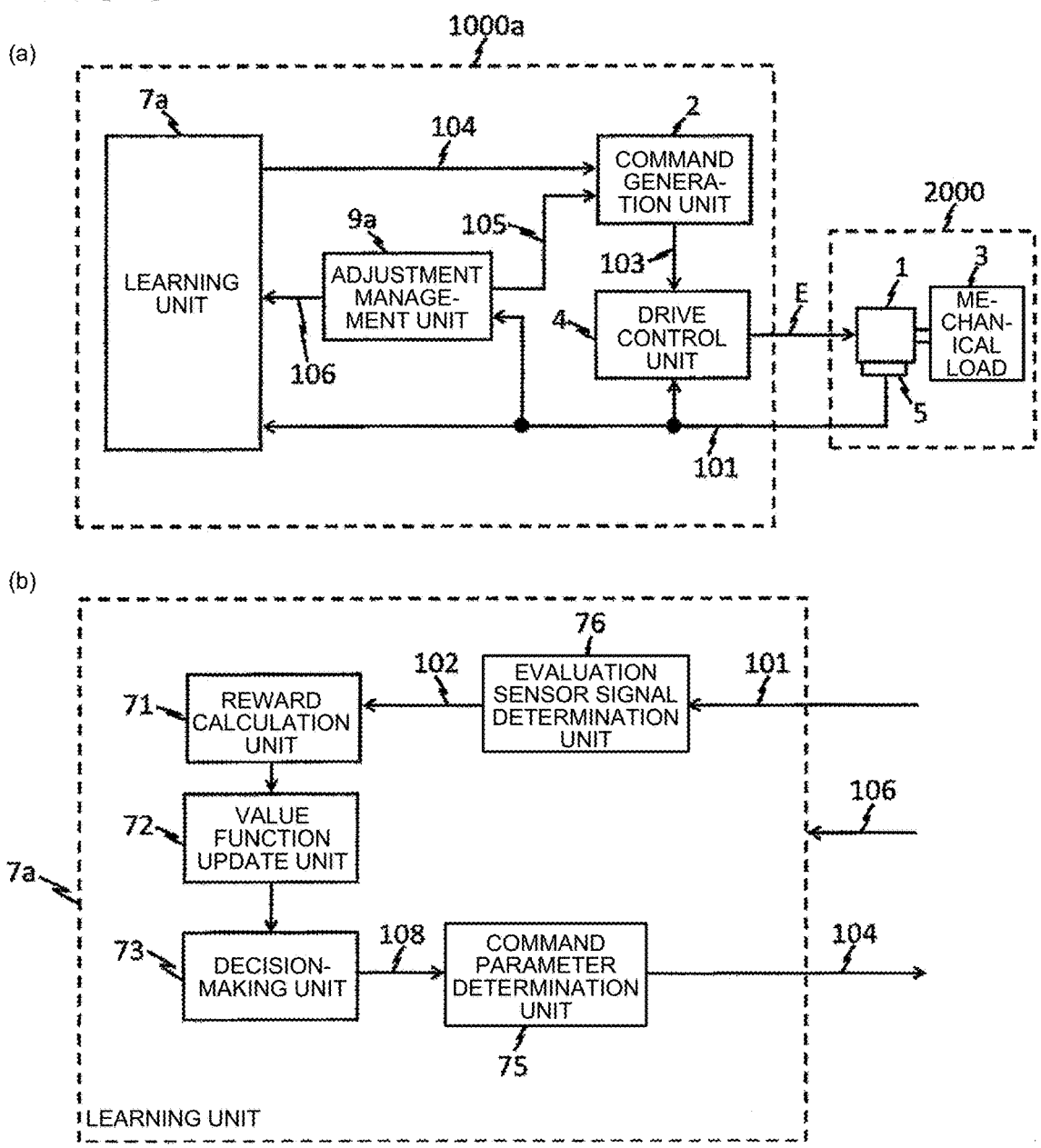
FIG. 9 is a block diagram illustrating an example of the configuration of a motor controller according to a second embodiment.

FIG. 9 is a block diagram illustrating an example of the configuration of a motor controller 1000a according to a second embodiment. FIG. 9(a) illustrates a configuration example of the entire motor controller 1000a. FIG. 9(b) illustrates a configuration example of a learning unit 7a. The motor controller 1000a includes the learning unit 7a instead of the learning unit 7 of the motor controller 1000 illustrated in FIG. 1 of the first embodiment, and includes an adjustment management unit 9a instead of the adjustment management unit 9 in FIG. 1. The configuration of the learning unit 7a is obtained by omitting the learning completion signal determination unit 74 from the configuration of the learning unit 7. Further, the adjustment management unit 9a in FIG. 9 detects the completion times of the evaluation operation and the initialization operation on the basis of the state sensor signal 101. The adjustment management unit 9a in FIG. 9 uses the completion time of the initialization operation in determining the start time of the evaluation operation. In the description of the motor controller 1000a illustrated in FIG. 9, components identical or corresponding to those in FIG. 1 are given the same reference numerals.

Figure 10:
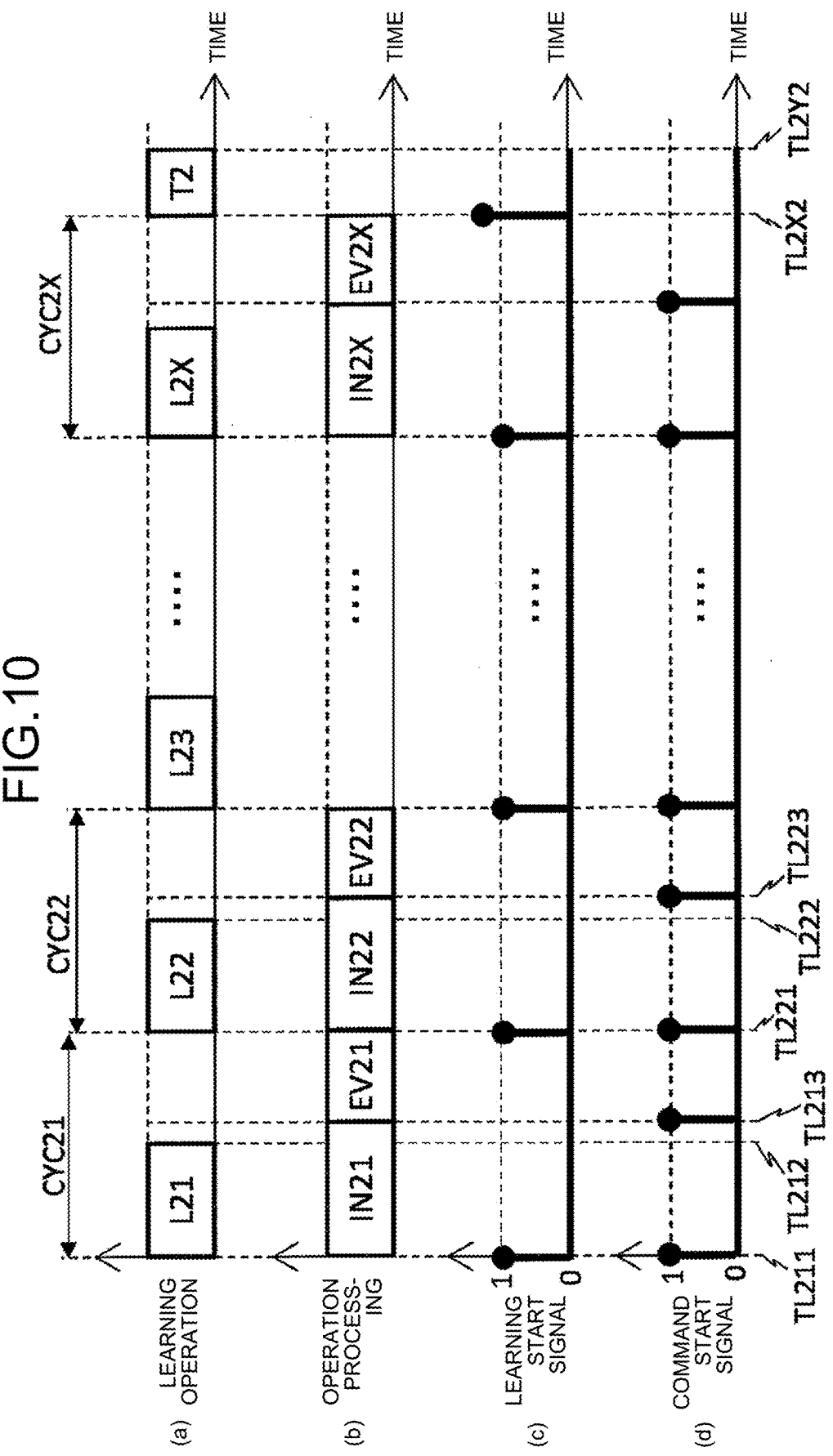
FIG. 10 is a diagram illustrating an example of operation timings in the motor controller according to the second embodiment.

FIG. 10 is a diagram illustrating an example of operation timings in the motor controller 1000a according to the second embodiment. The horizontal axes in FIGS. 10(a) to 10(d) represent time, and the vertical axes in FIGS. 10(a) to 10(d) represent the learning operation, the operation processing (the initialization operation and the evaluation operation), the learning start signal 106, and the command start signal 105, respectively. The relationships between the values of the signals, the command start signal 105 and the learning start signal 106, and information indicated by the signals are the same as those described in FIG. 2 of the first embodiment.

In the operation example in FIG. 10, the time required for the initialization operation is longer than the time required for the learning operation. Further, the initialization operation is completed after the learning operation. For this reason, the start time of the evaluation operation is determined on the basis of the completion time of the initialization operation instead of the completion time of the learning operation. The completion times of the initialization operation and the evaluation operation are detected on the basis of the state sensor signal 101. These respects are differences from the operation example in FIG. 2.

Figure 11:
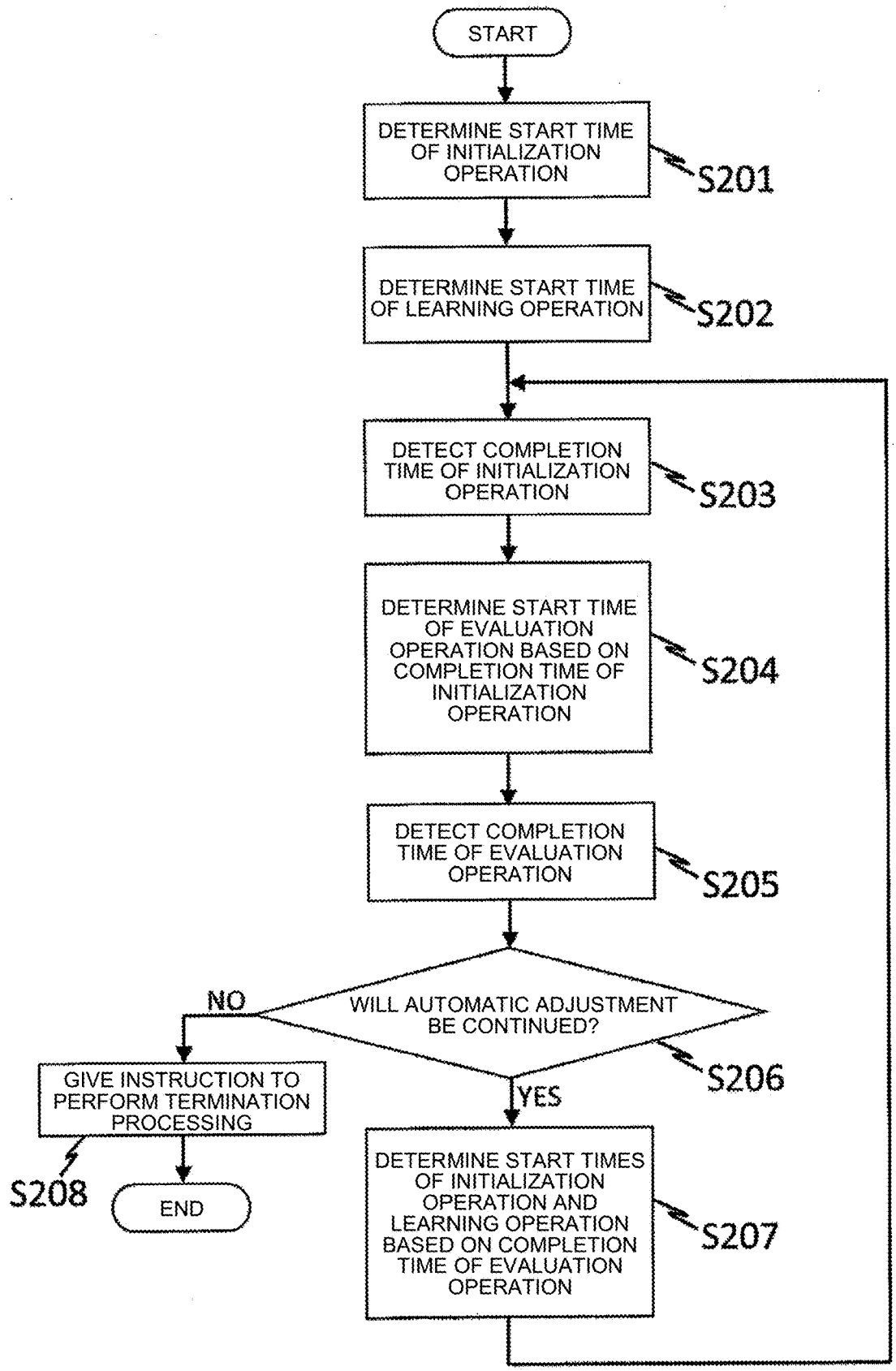
FIG. 11 is a flowchart illustrating an example of the operation of an adjustment management unit according to the second embodiment.

FIG. 11 is a flowchart illustrating an example of the operation of the adjustment management unit 9a according to the second embodiment. The operation of the motor controller 1000a will be illustrated with reference to FIGS. 10 and 11. Upon start of the automatic adjustment is started, the adjustment management unit 9a in step S201, determines that the value of the command start signal 105 at a time TL211 is 1, and determines that the start time of an initialization operation IN21 is the time TL211. The motor 1 starts the initialization operation IN21 at the time TL211 in accordance with the command start signal 105. After that, the initialization operation IN21 is completed at a time TL213.

In step S202, the adjustment management unit 9a determines that the value of the learning start signal 106 at the time TL211 is 1, and determines that the start time of a learning operation L21 is the time TL211. The learning unit 7a starts the learning operation L21 at the time TL211 in accordance with the learning start signal 106. After that, the learning operation L21 is completed at a time TL212. As in the learning operation L11 in FIG. 2, in the learning operation L21, the learning unit 7a may determine the command parameter 104 on the basis of a previous setting or randomly. The initialization operation IN21 and the learning operation L21 are performed in parallel. Since the time required for the initialization operation IN21 is longer than the time required for the learning operation L21, the time TL213 is a time following the time TL212. As in the operation example in FIG. 2, the start time of the learning operation L21 may be delayed beyond the start time of the initialization operation IN21 to the extent that the waiting time is not extended.

In step S203, the adjustment management unit 9a detects the time TL213 as the completion time of the initialization operation IN21, on the basis of the state sensor signal 101. In step S204, the adjustment management unit 9a determines that the value of the command start signal 105 at the time TL213 is 1, on the basis of the detected completion time of the initialization operation IN21, and determines the start time of an evaluation operation EV21 (a first evaluation operation). The motor 1 starts the evaluation operation EV21 at the time TL213 in accordance with the command start signal 105. After that, the evaluation operation EV21 is completed at a time TL221.

In step S205, the adjustment management unit 9a detects the time TL221 as the completion time of the evaluation operation EV21, on the basis of the state sensor signal 101. Then, in step S206, as in step S106 in FIG. 3, the adjustment management unit 9a determines whether or not to continue the automatic adjustment. In step S206 performed at the time TL221, the adjustment management unit 9a determines to continue the automatic adjustment and proceeds to step S207. The period between the time TL211 and the time TL221 is referred to as a learning cycle CYC21.

In step S207, the adjustment management unit 9a determines that the values of the command start signal 105 and the learning start signal 106 at the time TL221 are 1, on the basis of the completion time of the evaluation operation EV21. This operation determines the time TL221 as the start times of an initialization operation IN22 (a first initialization operation) and a learning operation L22 (a first learning operation). The motor 1 and the learning unit 7a start the initialization operation IN22 and the learning operation L22 in accordance with the command start signal 105 and the learning start signal 106, respectively. The initialization operation IN22 and the learning operation L22 are performed in parallel.

Thereafter, steps S203 to S207 are repeatedly performed until the adjustment management unit 9a determines not to continue the automatic adjustment in step S206. Then, in step S204 in a learning cycle CYC22, the adjustment management unit 9a determines that the value of the command start signal 105 at a time TL223 is 1, on the basis of TL223 that is the completion time of the initialization operation IN22. This operation determines the time TL223 as the start time of an evaluation operation EV22 (a second evaluation operation). The motor 1 starts the evaluation operation EV22 at the time TL223 in accordance with the command start signal 105.

In step S205 in a learning cycle CYC2X that is a final learning cycle, the adjustment management unit 9a detects a time TL2X2 as the completion time of an evaluation operation EV2X. Then, in step S206, the adjustment management unit 9a determines not to continue the automatic adjustment, and the process proceeds to step S208. In step S208, the adjustment management unit 9a instructs the learning unit 7a to perform termination processing T2 as in step S108 in FIG. 3. The learning unit 7a performs the termination processing T2 in the same manner as the termination processing T1 in FIG. 2. In the present embodiment, as in the first embodiment, a plurality of control targets similar to the control target 2000 may be allowed to perform evaluation operations in parallel to efficiently perform the automatic adjustment. The motor controller may be configured using a learned learning device including the results of the learning according to the present embodiment. Through the learning according to the present embodiment, the automatic adjustment of the control command to control the motor may be performed, or the manufacturing of the motor controller may be performed.

In detecting the completion of the operation in step S203 or step S205, the adjustment management unit 9a may detect the completion of the operation by detecting that the deviation that is the difference between the state sensor signal 101 indicating the position of the motor 1 and the target travel distance has become less than or equal to a predetermined reference value. Further, when the adjustment management unit 9a detects that the deviation has not exceeded the reference value for a predetermined period of time in addition to detecting that the deviation has become less than or equal to the reference value, the adjustment management unit 9a may determine that the operation has been completed. The adjustment management unit 9a is not limited to using the state sensor signal 101, but may use a signal that has detected the state of the control target 2000, to detect the completion time of the operation. Furthermore, the command signal 103 may be used to detect the completion time of the operation.

The present embodiment can provide the motor controller capable of shortening the time required for the automatic adjustment to adjust the control command to control the motor by repeating the initialization operation, the evaluation operation, and the learning operation when performing the automatic adjustment.

The evaluation operation EV21 (the first evaluation operation), which is one of the evaluation operations, may be performed, and the learning operation L22 (the first learning operation) may be performed using the state sensor signal 101 acquired at the time of the evaluation operation EV21. Then, the initialization operation IN22 (the first initialization operation) may be performed in parallel with the learning operation L22, and the evaluation operation EV22 (the second evaluation operation) that is an evaluation operation subsequent to the evaluation operation EV21 may be performed from the initial state set by the initialization operation IN22, on the basis of the command parameter 104 (the control command) determined in the learning operation L22. This operation allows the learning operation L22 and the initialization operation IN22 to be performed in parallel to shorten the time required for the automatic adjustment. The motor controller 1000a or the motor control method capable of efficiently performing the automatic adjustment in this manner may be provided.

The adjustment management unit 9a may detect the completion time of the evaluation operation EV21, and determine, on the basis of the detected completion time, the start time of the learning operation L22 and the start time of the initialization operation IN22, and shortens the waiting time between the processes. The adjustment management unit 9a may determine that the start time of one of the learning operation L22 and the initialization operation IN22, the one operation requiring a longer time, is the same as or precedes the start time of the other, and shortens the waiting time between the processes. The adjustment management unit 9a may detect the completion time of one of the initialization operation IN22 and the learning operation L22, the one operation being completed at the same time as or later than the other, determine the start time of the evaluation operation EV22 on the basis of the detected completion time and shorten the waiting time between the processes. When two processes continuously performed are referred to as a previous process and a subsequent process, it is preferable to shorten the interval between the completion time of the previous process and the start time of the subsequent process to the extent possible, and it is more preferable to determine that the completion time of the previous process and the start time of the subsequent process are the same time or substantially the same. Furthermore, the drive control unit 4 may drive the motor 1 in such a manner that the motor 1 follows the command signal 103 that is a command value to control the motor 1, the command value being a command value of the position, velocity, acceleration, current, torque, or thrust, and detect the completion time of the evaluation operation or the initialization operation using a signal having detected the state of the control target 2000 or the command signal 103, to accurately detect the completion time of the operation. Even when the time required for an operation changes, the time required for the automatic adjustment may be shortened by utilizing the fact that the start time of the next process can be accurately determined. The motor controller 1000a or the motor control method capable of efficiently performing the automatic adjustment as described above may be provided.

Third Embodiment

Figure 12:
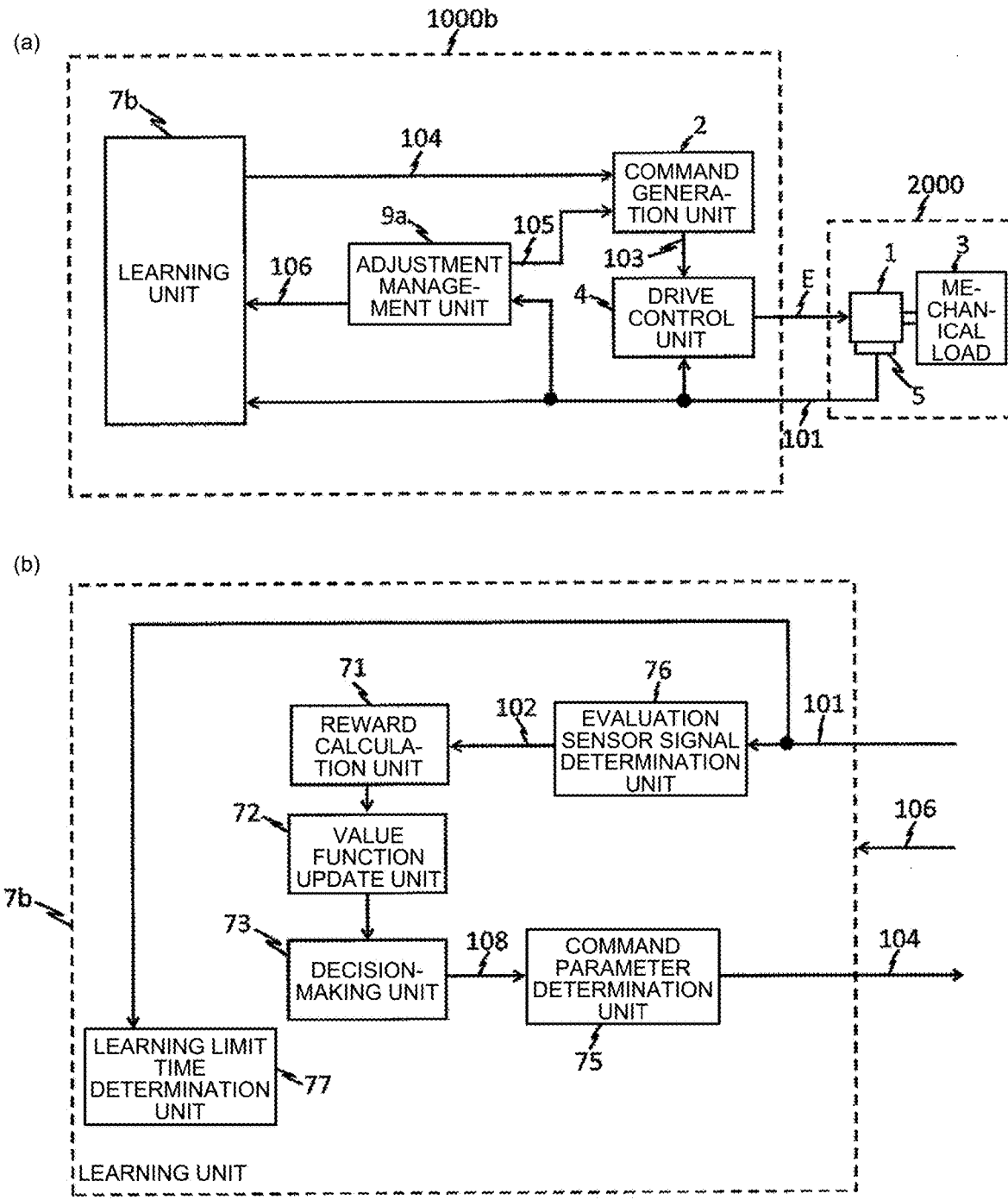
FIG. 12 is a block diagram illustrating an example of the configuration of a motor controller according to a third embodiment.

FIG. 12 is a block diagram illustrating an example of the configuration of a motor controller 1000b according to a third embodiment. FIG. 12(*a*) illustrates a configuration example of the entire motor controller 1000b. FIG. 12(*b*) illustrates a configuration example of a learning unit 7b. The configuration of the motor controller 1000b is the same as that of the motor controller 1000a illustrated in FIG. 9 of the second embodiment except that the learning unit 7b is included instead of the learning unit 7a. Of the components illustrated in FIG. 12 of the present embodiment, components identical or corresponding to the components illustrated in FIG. 9 of the second embodiment are given the same reference numerals.

The learning unit 7b includes a learning limit time determination unit 77 in addition to the components of the learning unit 7a in FIG. 9(*b*). The learning limit time determination unit 77 calculates an estimated value of the time required for the initialization operation, as an estimated initialization operation required time. Then, on the basis of the estimated initialization operation required time, the upper limit value of a learning time that is a period of time during which the learning unit 7b performs the learning operation is determined as a learning limit time TLIM1. The learning limit time determination unit 77 may determine that the learning limit time TLIM1 is a period of time equal to or shorter than the estimated initialization operation required time. Then, the learning unit 7b may perform the learning operation for a period of time equal to or shorter than the learning limit time TLIM1. Performing the learning operation in this manner can complete the learning operation before the completion of the initialization operation. The learning unit 7b may acquire the estimated initialization operation required time from the outside. The learning unit 7b may obtain, from, for example, the state sensor signal 101 and the command signal 103, a practical measured value of the time having been taken for the initialization operation and estimate or update the estimated initialization operation required time, using the practical measured value.

The learning limit time determination unit 77 may further determine a basic learning time TSL1 in advance. The basic learning time TSL1 is the lower limit of the learning time. The learning unit 7b may perform the learning operation for the same length of time as or a length of time longer than that of the basic learning time TSL1. For example, the basic learning time TSL1 may set as a minimum amount of time to determine the command parameter 104, or may be set as a minimum amount of time to determine the command parameter 104 with desired accuracy. The learning limit time determination unit 77 may further set an additional learning time TAD1 on the basis of the basic learning time TSL1 and the learning limit time TLIM1 so that the sum of the basic learning time TSL1 and the additional learning time TAD1 does not exceed the learning limit time TLIM1. This condition is expressed by formula (26). The learning limit time TLIM1 is set longer than the basic learning time TSL1.

[Formula 26]

$$TSL1+TAD1<TLIM1 \qquad (26)$$

The learning unit 7b performs learning during the basic learning time TSL1. Then, the learning operation may be further performed during the additional learning time TAD1 to improve the accuracy of the command parameter 104. The learning unit 7b can perform learning for the learning time set in advance as the lower limit, using the basic learning time TSL1. The learning limit time TLIM1 alone may be set without setting the basic learning time TSL1 and the additional learning time TAD1. The learning limit time determination unit 77 may store the estimated initialization operation required time, the learning limit time TLIM1, the basic learning time TSL1, the additional learning time TAD1, etc. in a storage device.

Next, the relationship between the learning time and the accuracy of the command parameter determined in the learning operation will be described. For example, when Q-learning is used as the learning algorithm, the decision-making unit 73 selects an action at that increases the value of the action-value function Q as the evaluation candidate parameter 108. In performing this selection, if the number of action-value functions Q is a continuous function, for example, the decision-making unit 73 may perform iterative calculation. In such a case where iterative calculation is performed during the learning operation, the decision-making unit 73 can improve calculation accuracy by lengthening calculation time and increasing the number of calculation steps. Thus, when the learning operation includes iterative calculation, the effects of the present embodiment are more remarkably exhibited. Examples of the iterative calculation include a method of obtaining the gradient numerically such as the method of steepest descent or Newton's method, and a method using stochastic elements such as a Monte Carlo method.

Figure 13:
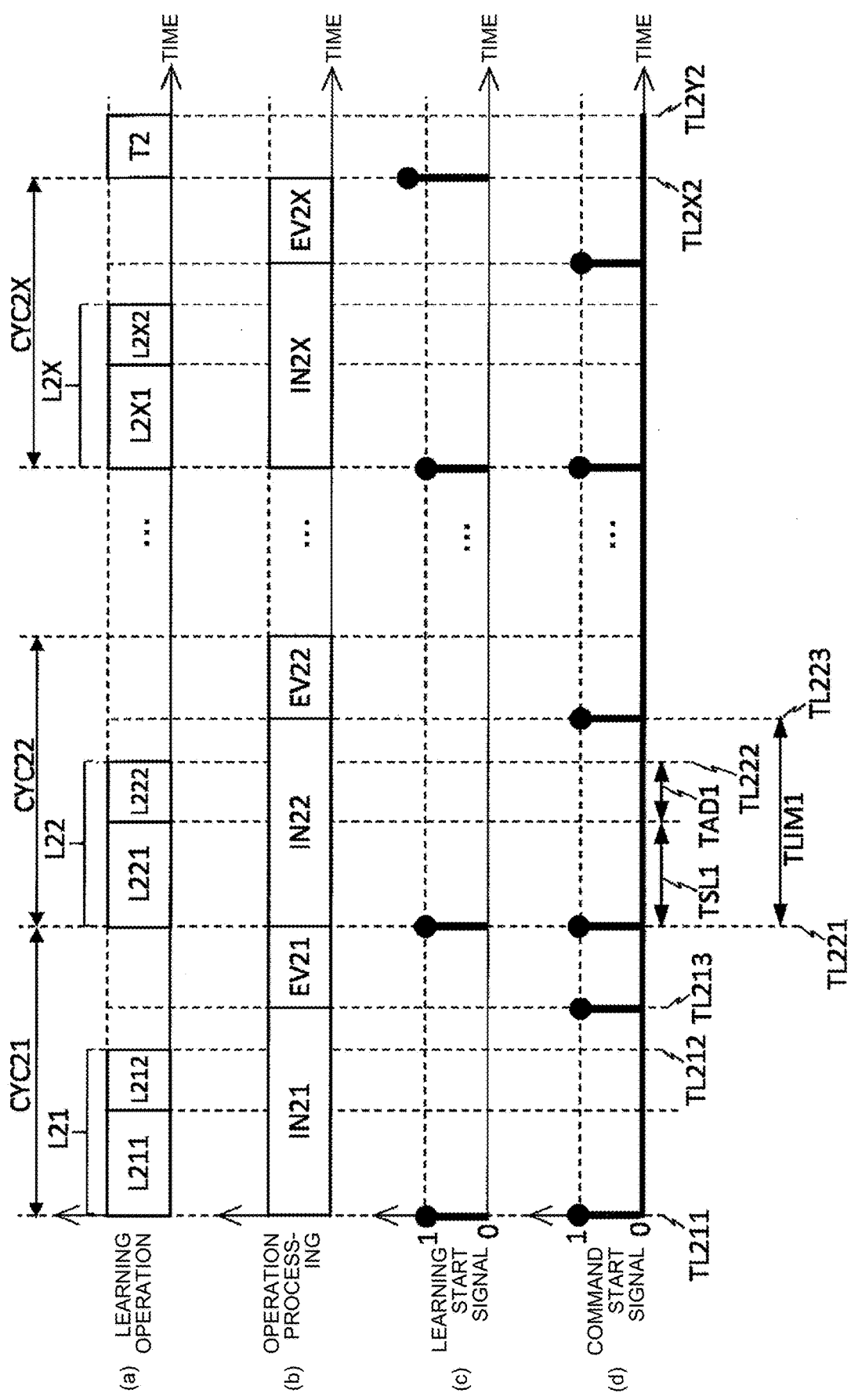
FIG. 13 is a diagram illustrating an example of operation timings in the motor controller according to the third embodiment.

FIG. 13 is a diagram illustrating an example of operation timings in the motor controller 1000b according to the third embodiment. The horizontal axes in FIGS. 13(*a*) to 13(*d*) represent time, and the vertical axes in FIGS. 13(*a*) to 13(*d*) represent the learning operation, the operation processing (the initialization operation and the evaluation operation), the learning start signal 106, and the command start signal 105, respectively. The relationships between the values of the signals, the command start signal 105 and the learning start signal 106, and the operation timings indicated by the signals in FIG. 13 are the same as those described in FIG. 2 of the first embodiment. The operation of the motor controller 1000b illustrated in FIG. 13 is the same as that in FIG. 10 except for the operation of the learning unit 7b. In FIG. 13, operations, learning, learning cycles, times, etc. identical or corresponding to those in FIG. 10 are given the same reference numerals as those in FIG. 10. A flowchart of the operation of the adjustment management unit 9a in the operation example in FIG. 13 is the same as that in FIG. 11 of the second embodiment. An operation example of the motor controller 1000b will be described with reference to FIGS. 11 and 13.

In the operation example in FIG. 13, the learning limit time determination unit 77 calculates the estimated initialization operation required time on the basis of a practical measured value of the time having been taken for the initialization operation IN21. Then, the learning limit time TLIM1 is determined as a period of time equal to or shorter than the estimated initialization operation required time. Further, the learning limit time determination unit 77 determines the basic learning time TSL1 as the lower limit of the learning time, and sets the difference between the learning limit time TLIM1 and the basic learning time TSL1, as the additional learning time TAD1.

In the operation example in FIG. 13, only the operation of the learning unit 7b is different from that in FIG. 10 of the second embodiment. Thus, the operation of the learning unit 7b will be described using the learning cycle CYC22 as an example. The learning unit 7b starts the learning operation L22 (the first learning operation) at the time TL221 in accordance with the learning start signal 106 determined in step S202 in the learning cycle CYC22. The learning unit 7b performs a partial learning operation L221 and a partial learning operation L222, as the learning operation L22. The length of the partial learning operation L221 is the basic learning time TSL1. The length of the partial learning operation L222 is the additional learning time TAD1. Further, the learning unit 7b completes the learning operation L22 at the time TL222 that is the time at which the basic learning time TSL1 and the additional learning time TAD1 have elapsed from the time TL221. The value of the time TL222 is equal to the sum of three, the value of the time TL221, the basic learning time TSL1, and the additional learning time TAD1, and a relationship in formula (27) holds true.

[Formula 27]

$$TL222 = TL221 + TSL1 + TAD1 \quad (27)$$

In the operation example in FIG. 13, the start time of the initialization operation and the start time of the learning operation are the same. When the time required for the initialization operation is longer than the time required for the learning operation, the learning operation may start later than the initialization operation. The learning limit time determination unit 77 may determine the learning limit time TLIM1 such that the time at which the estimated initialization operation required time has elapsed from the start time of the initialization operation IN22 follows the time at which the learning limit time TLIM1 has elapsed from the start time of the learning operation L22 (the first learning operation). Then, the learning unit 7b may perform the learning operation L22 for a period of time equal to or shorter than the learning limit time TLIM1. This allows the learning operation L22 to be completed before the completion of the initialization operation IN22 even when the start time of the learning operation L22 is later than the start time of the initialization operation IN22. Under these circumstances, the evaluation operation EV22 can start immediately after the completion of the initialization operation IN22 without the need to wait for the completion of the learning operation L22. Consequently, an increase in delay time due to waiting for the completion of the learning operation L22 does not occur. Thus, the time required for the automatic adjustment can be shortened. The motor controller 1000b or the motor control method capable of efficiently performing the automatic adjustment in this manner may be provided.

The learning limit time determination unit 77 may determine the basic learning time TSL1 that is the lower limit of the learning time in addition to the learning limit time TLIM1. Then, the learning unit 7b may perform the learning operation L22 for a period of time equal to or longer than the basic learning time TSL1 and equal to or shorter than the learning limit time TLIM1. Performing the learning operation in this manner makes it possible to secure the learning time set in advance as the lower limit, using the learning limit time TLIM1. For example, setting the basic learning time TSL1 as the minimum amount of time required to obtain the command parameter 104 makes it possible to calculate the command parameter 104 at each learning cycle with a higher probability. The motor controller 1000b or the motor control method capable of efficiently performing the automatic adjustment as described above may be provided.

The present embodiment can provide the motor controller capable of shortening the time required for the automatic adjustment to adjust the command parameter 104 (the control command) to control the motor 1 by repeating the initialization operation, the evaluation operation, and the learning operation when performing the automatic adjustment.

Fourth Embodiment

Figure 14:
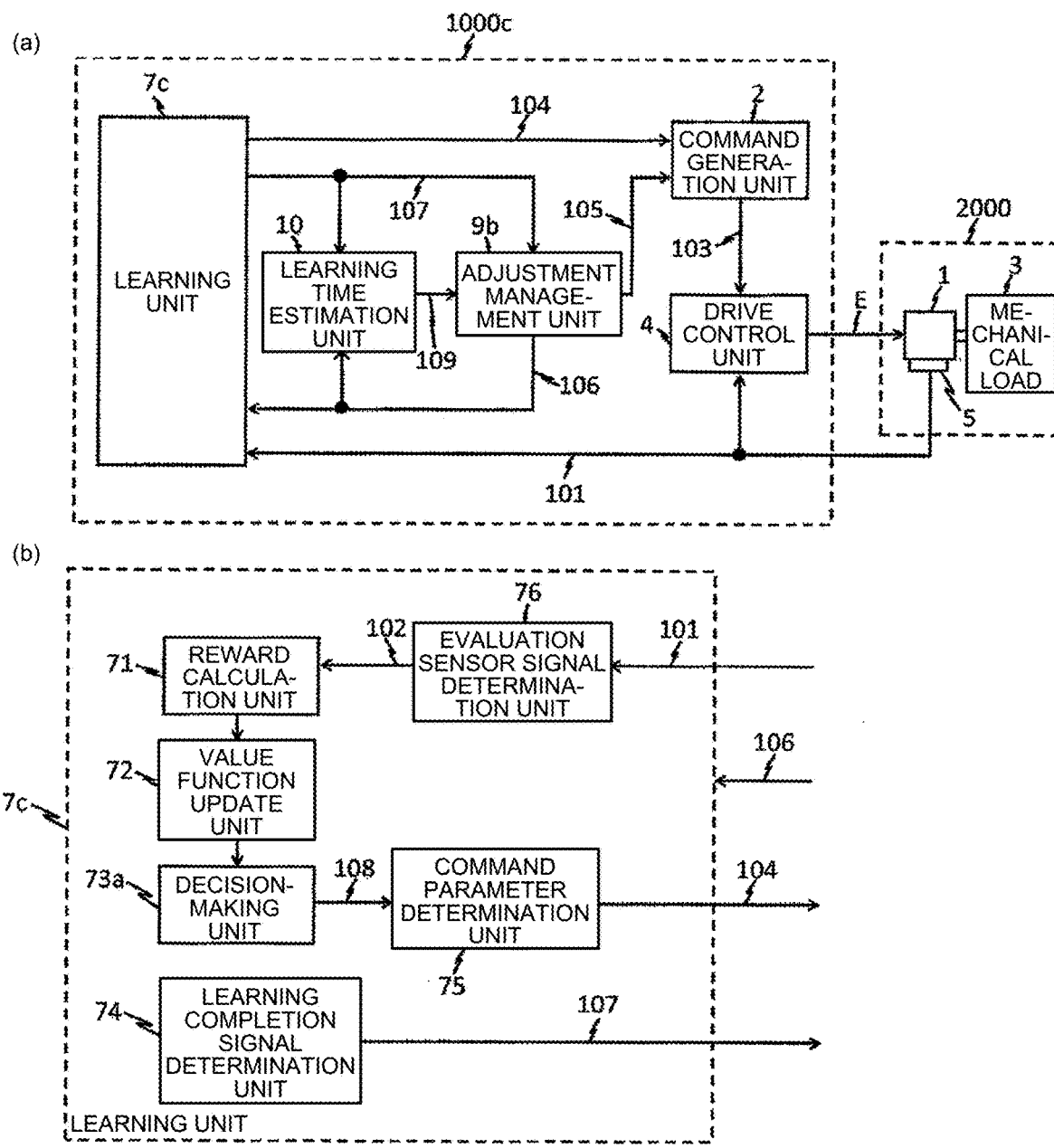
FIG. 14 is a block diagram illustrating an example of the configuration of a motor controller according to a fourth embodiment.

FIG. 14 is a block diagram illustrating an example of the configuration of a motor controller 1000c according to a fourth embodiment. FIG. 14(a) illustrates a configuration example of the entire motor controller 1000c. FIG. 14(b) illustrates an example configuration of a learning unit 7c. The motor controller 1000c illustrated in FIG. 14 includes the learning unit 7c instead of the learning unit 7 of the motor controller 1000 according to the first embodiment illustrated in FIG. 1, and includes an adjustment management unit 9b instead of the adjustment management unit 9. Furthermore, the motor controller 1000c includes a learning time estimation unit 10 in addition to the components of the motor controller 1000 in FIG. 1. In the description of the motor controller 1000c illustrated in FIG. 14, components identical or corresponding to those in FIG. 1 or 5 of the first embodiment are given the same reference numerals.

Although various learning algorithms can be applied to learning in the present embodiment, a case where reinforcement learning based on Q-learning is used will be illustrated. The learning unit 7c illustrated in FIG. 14 includes a decision-making unit 73a instead of the decision-making unit 73 of the learning unit 7 in the first embodiment illustrated in FIG. 5. The learning unit 7 in FIG. 5 acquires, in a single learning operation, one set of the command parameter 104 used in the evaluation operation and the state sensor signal 101 at the time of the evaluation operation, and determines the command parameter 104 once. On the other hand, the learning unit 7c acquires a plurality of the sets in a single learning cycle. Then, the reward calculation unit 71 and the value function update unit 72 perform, for each of the acquired sets, the calculation of the reward r and the update of the action-value function Q based on the calculated reward r. As a result, the learning unit 7c performs the calculation of the reward r and the update of the action-value function Q a plurality of times in a single learning cycle.

The decision-making unit 73a determines a plurality of evaluation candidate parameters 108 on the basis of the action-value function Q that has been updated the plurality of times and the plurality of sets of data used in the updates. Then, on the basis of the determined evaluation candidate parameters 108, the command parameter determination unit 75 determines the command parameter 104 to be used in the evaluation operation after the learning operation being performed.

The operation of the decision-making unit 73a will be described. The decision-making unit 73a acquires the action-value function $Q(s_t, a_t)$ in formula (25) updated by the value function update unit 72. Then, the decision-making unit 73a calculates the values of the action-value function Q corresponding to the plurality of actions $a_t$, that is, the plurality of command parameters 104 included in the plurality of sets of data. When the action $a_t$ (the command parameter 104) is selected, a value of the action-value function $Q(s_t, a_t)$ is given. In that case, the action $a_t$ (the command parameter 104) and the value of the action-value function $Q(s_t, a_t)$ correspond to each other. Further, the decision-making unit 73a selects, from the plurality of calculated values of the action-value function Q, a predetermined number of values of the action-value function Q in descending order. Then, the decision-making unit 73a determines that the command parameters 104 corresponding to the selected values of the action-value function Q are the evaluation candidate parameters 108. The above is an example of the operation of the decision-making unit 73a. The number of command parameters 104 determined by the command parameter determination unit 75 may be equal to the number of evaluation operations to be performed in a learning cycle subsequent to the learning operation being performed.

Next, the learning time estimation unit 10 will be described. The learning time estimation unit 10 calculates an estimated value of the learning time of the learning operation to be performed, as an estimated learning time, and outputs an estimated learning time signal 109 indicating the estimated learning time. The learning time estimation unit 10 may acquire the learning start signal 106 and the learning completion signal 107 about the learning operation having been performed, and acquire a practical measured value of the learning time from the difference between the learning start time and the learning completion time. Then, on the basis of the acquired practical measured value of the learning time, the learning time estimation unit 10 may calculate an estimated value of the learning time of the learning operation to be performed, as the estimated learning time. The learning time estimation unit 10 may acquire the estimated learning time through an input from the outside, or may update the estimated learning time on the basis of an actual measured value of the learning time.

Next, the adjustment management unit 9b will be described. The adjustment management unit 9b determines the learning start signal 106 on the basis of the learning completion signal 107, thereby determining the start time of the next learning operation on the basis of the completion time of the learning operation. Further, the adjustment management unit 9b determines in advance an initialization operation required time that is the time required for the initialization operation, and an evaluation operation required time that is the time required for the evaluation operation. By detecting the lapse of the initialization operation required time and the evaluation operation required time from the start times of the initialization operation and the evaluation operation, the adjustment management unit 9b detects each of the completion times of the initialization operation and the evaluation operation. On the basis of the detected completion times of the initialization operation and the evaluation operation, the adjustment management unit 9b determines the respective start times of the evaluation operation and the initialization operation to be performed next.

Like the adjustment management unit 9a in the second embodiment, the adjustment management unit 9b may accurately detect the completion times of the initialization operation and the evaluation operation on the basis of a signal that has detected the state of the control target 2000 or the command signal 103. The operation of the motor 1 made up of the initialization operation and the evaluation operation starting from the initial state set by the initialization operation is referred to as an evaluation operation cycle. The adjustment management unit 9b determines whether or not to complete the evaluation operation cycle at each completion time of the evaluation operation. The completion time of the evaluation operation is hereinafter sometimes referred to as a determination time.

Figure 15:
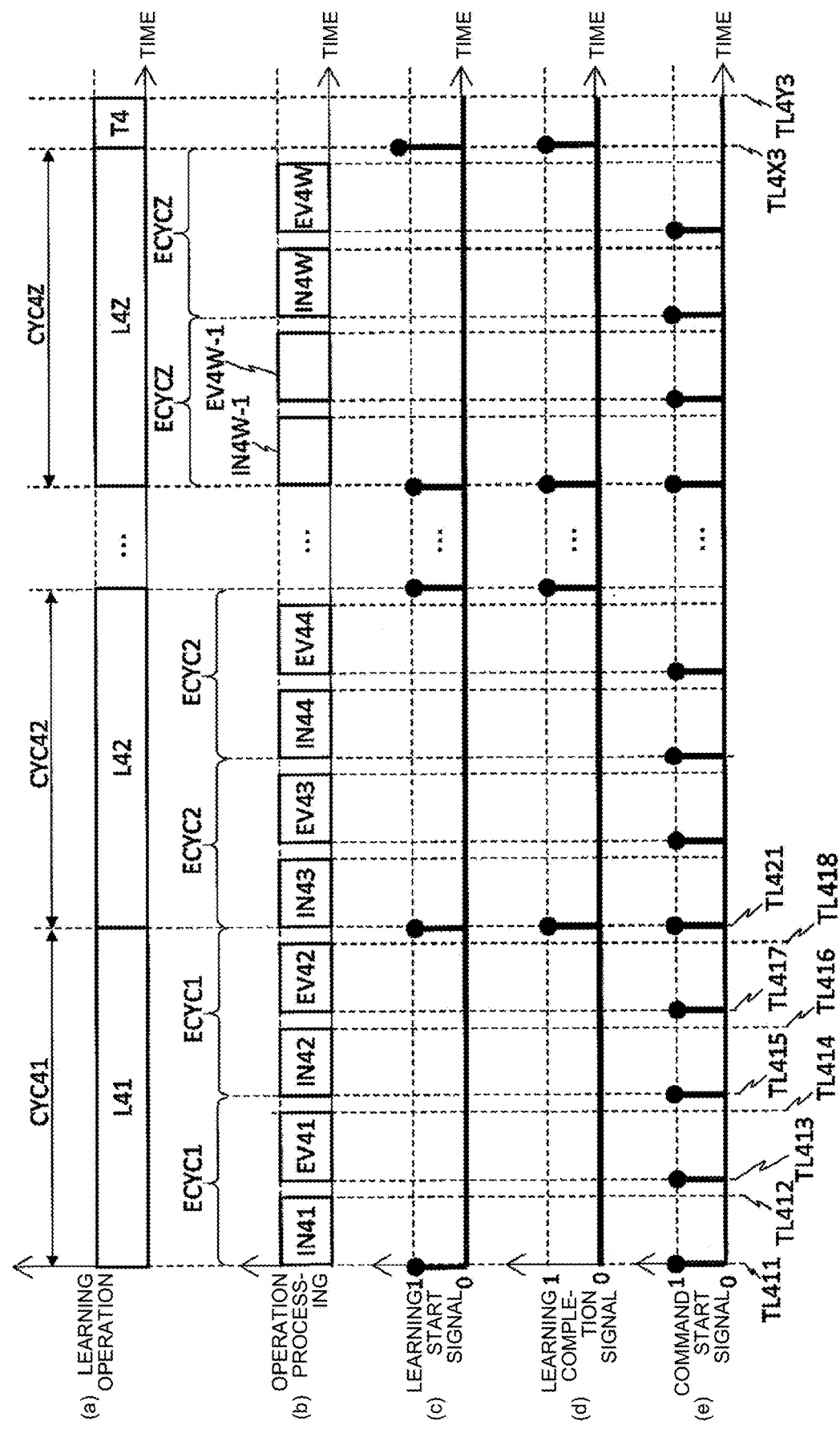
FIG. 15 is a diagram illustrating an example of operation timings in the motor controller according to the fourth embodiment.
Figure 16:
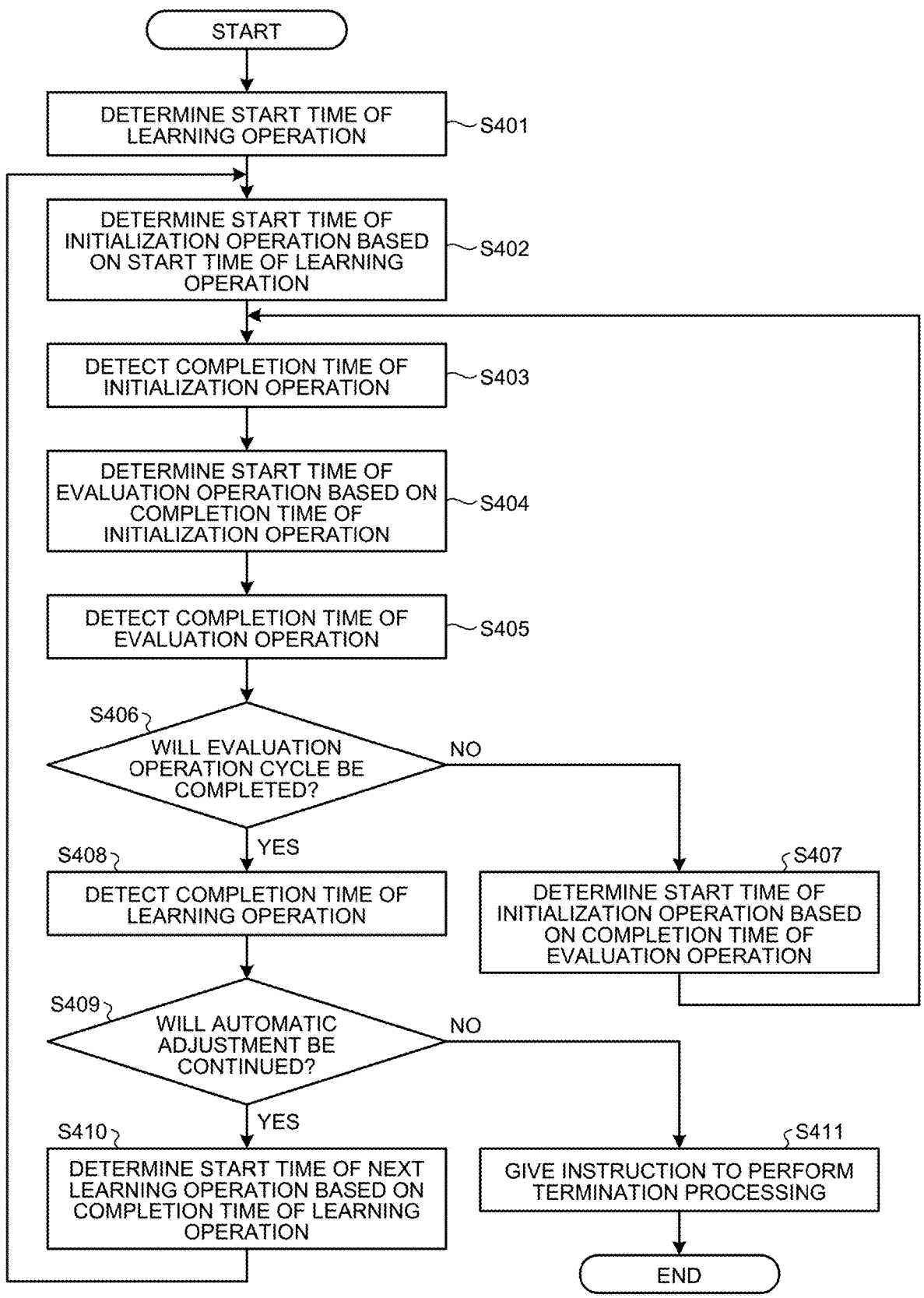
FIG. 16 is a flowchart illustrating an example of the operation of an adjustment management unit according to the fourth embodiment.

FIG. 15 is a diagram illustrating an example of operation timings in the motor controller 1000c according to the fourth embodiment. The horizontal axes in FIGS. 15(a) to 15(e) represent time, and the vertical axes in FIGS. 15(a) to 15(e) represent the learning operation, the operation processing (the initialization operation and the evaluation operation), the learning start signal 106, the learning completion signal 107, and the command start signal 105, respectively. The relationships between the values of the learning start signal 106, the learning completion signal 107, and the command start signal 105 and the timings of the learning operation or the operations indicated by the signals are the same as those described in FIG. 2 of the first embodiment. FIG. 16 is a flowchart illustrating an example of the operation of the adjustment management unit 9b according to the fourth embodiment. In FIG. 15, in a single learning cycle, a single learning operation is performed, and two evaluation operation cycles are performed in parallel with the learning operation. However, the number of evaluation operation cycles performed in parallel with the learning operation may be three or more.

The operation of the motor controller 1000c will be illustrated with reference to FIGS. 15 and 16. Upon start of the automatic adjustment, the adjustment management unit 9b in step S401, determines that the value of the learning start signal 106 at a time TL411 is 1, and determines the time TL411 as the start time of a learning operation L41 (a third learning operation). The learning unit 7c starts the learning operation L41 at the time TL411 in accordance with the learning start signal 106. In step S402, the adjustment management unit 9b determines that the value of the command start signal 105 at the time TL411 is 1, on the basis of the start time of the learning operation L41, and determines the time TL411 as the start time of an initialization operation IN41. The motor 1 starts the initialization operation IN41 at the time TL411 in accordance with the command start signal 105. Then, the motor 1 completes the initialization operation IN41 at a time TL412, and enters a standby state after the completion of the initialization operation IN41. In step S402, the adjustment management unit 9b determines the start time of a first evaluation operation cycle ECYC1 (a first evaluation operation cycle) by determining the start time of the initialization operation IN41.

In step S403, the adjustment management unit 9b detects that the initialization operation required time has elapsed from the time TL411, and detects a time TL413 as the completion time of the initialization operation IN41. In step S404, the adjustment management unit 9b determines that the value of the command start signal 105 at the time TL413 is 1, on the basis of the detected completion time of the initialization operation IN41, and determines the time TL413 as the start time of an evaluation operation EV41. The motor 1 starts the evaluation operation EV41 at the time TL413 in accordance with the command start signal 105. After that, the motor 1 completes the evaluation operation EV41 at a time TL414, and enters a standby state after the completion of the evaluation operation EV41.

In step S405, the adjustment management unit 9b detects that the evaluation operation required time has elapsed from the time TL413, and detects a time TL415 as the completion time of the evaluation operation EV41. In step S406, the adjustment management unit 9b determines whether or not to complete the evaluation operation cycle being performed. If the adjustment management unit 9b determines not to complete the evaluation operation cycle, the process proceeds to step S407. If the adjustment management unit 9b determines to complete the evaluation operation cycle, the process proceeds to step S408.

The determination in step S406 will be illustrated. The adjustment management unit 9b determines in advance an estimated evaluation operation cycle required time that is an estimated value of the time required for a single evaluation operation cycle. At the determination time, the adjustment management unit 9b acquires the estimated learning time signal 109, and calculates an estimated learning time elapsed time that is the time at which the estimated learning time has elapsed from the start time of the learning operation L41. Further, if the period of time from the determination time that is the completion time of the evaluation operation to the estimated learning time elapsed time is shorter than the estimated evaluation operation cycle required time, the adjustment management unit 9b determines to complete the evaluation operation cycle ECYC1. If the period of time from the determination time to the estimated learning time elapsed time is longer than or equal to the estimated evaluation operation cycle required time, the adjustment management unit 9b determines not to complete the evaluation operation cycle ECYC1. In other words, if a single evaluation operation cycle cannot be performed during the remaining time before the estimated learning time elapsed time, the adjustment management unit 9b determines to complete the evaluation operation cycle ECYC1. If a single evaluation operation cycle can be performed during the remaining time, the adjustment management unit 9b determines not to complete the evaluation operation cycle ECYC1. The above is an example of the determination in step S406.

In the determination in step S406 at the time TL415, the adjustment management unit 9b determines not to complete the evaluation operation cycle ECYC1, and proceeds to step S407. In step S407, the adjustment management unit 9b determines that the value of the command start signal 105 at the time TL415 is 1, on the basis of the completion time of the evaluation operation EV41, and determines the time TL415 as the start time of an initialization operation IN42. In accordance with the command start signal 105, the motor 1 starts the initialization operation IN42 at the time TL415. Thereafter, the adjustment management unit 9b repeatedly performs steps S403 to S407 until, in step S406, the adjustment management unit 9b determines to complete the evaluation operation cycle ECYC1.

At a determination time at a time TL421, the adjustment management unit 9b performs the determination in step S406, determines to complete the evaluation operation cycle ECYC1, and proceeds to step S408. In step S408, the adjustment management unit 9b detects the time TL421 as the completion time of the learning operation L41, on the basis of the learning completion signal 107. Next, in step S409, as in step S106 in FIG. 3 of the first embodiment, the adjustment management unit 9b determines whether or not to continue the automatic adjustment. If the adjustment management unit 9b determines to continue the automatic adjustment, the process proceeds to step S410. If the adjustment management unit 9b determines not to continue the automatic adjustment, the process proceeds to step S411. In the determination in step S409 at the time TL421, the adjustment management unit 9b determines to continue the automatic adjustment.

A learning cycle CYC41 is the period between the time TL411 and the time TL421. The evaluation operation cycle ECYC1 starts from a state in which no learning operation has been performed. Thus, the evaluation operation EV41 and the evaluation operation EV42 may be performed using the command parameter 104 set in advance or the command parameter 104 determined randomly. In the learning operation L41, as in the learning operation L11 of the first embodiment, the command parameter 104 may be randomly determined, or the command parameter 104 may be determined on the basis of a setting.

In step S410, the adjustment management unit 9b determines that the value of the learning start signal 106 at the time TL421 is 1, on the basis of the completion time of the learning operation L41, and determines the time TL421 as the start time of a learning operation L42 (a fourth learning operation). The learning unit 7c starts the learning operation L42 at the time TL421 in accordance with the learning start signal 106. The learning operation L42 is performed on the basis of the command parameter 104 used in the evaluation operation cycles ECYC1 and the state sensor signal 101 acquired in the evaluation operation cycles ECYC1. Thereafter, the adjustment management unit 9b repeatedly performs steps S402 to S410 until, in step S409, the adjustment management unit 9b determines not to continue the automatic adjustment. An evaluation operation cycle ECYC2 (a second evaluation operation cycle) is performed using the command parameter 104 determined in the learning operation L41. In step S402, the adjustment management unit 9b determines the time TL421 as the start time of an initialization operation IN43, thereby determining the time TL421 as the start time of the evaluation operation cycle ECYC2.

In the determination in step S409 at a time TL4X3 in a learning cycle CYC4Z, the adjustment management unit 9b determines not to continue the automatic adjustment, and proceeds to step S411. In step S411, the adjustment management unit 9b gives an instruction to perform termination processing T4 as in step S108 in FIG. 3 of the first embodiment. Then, the learning unit 7c performs the termination processing T4 in the same manner as the termination processing T1 in FIG. 2 of the first embodiment.

In the present embodiment, as in the first embodiment, a plurality of control targets similar to the control target 2000 may be allowed to perform evaluation operations in parallel to efficiently perform the automatic adjustment. For example, if a plurality of control targets are allowed to perform the evaluation operation cycle in parallel during the learning operation L41 in FIG. 15, more sets of the state sensor signal 101 and the command parameter 104 can be acquired in a single evaluation operation cycle, so that learning can be efficiently performed. The motor controller may be configured using a learned learning device that includes the results of the learning according to the present embodiment. Further, the learning according to the present embodiment may be performed to thereby perform, for example, the automatic adjustment of the control command to control the motor, and the manufacturing of the motor controller. Furthermore, the motor control method capable of efficiently performing the automatic adjustment may be provided.

The learning operation L41 (the third learning operation), which is one of the learning operations, may be performed, and the evaluation operation cycle ECYC1 (the first evaluation operation cycle), which is one of the evaluation operation cycles, may be performed a plurality of times in parallel with the learning operation L41. Further, the learning operation L42 (the fourth learning operation), which is a learning operation subsequent to the learning operation L41, may be performed using the state sensor signal 101 acquired at the time of the evaluation operation cycle ECYC1. Then, using the command parameter 104 (the control command) determined in the learning operation L41, the evaluation operation cycle ECYC2 (the second evaluation operation cycle), which is an evaluation operation cycle subsequent to the evaluation operation cycle ECYC1, may be performed a plurality of times in parallel with the learning operation L42. With this operation, the evaluation operation cycle may be performed a plurality of times during a single learning operation to efficiently acquire sets of the command parameter 104 and the evaluation sensor signal 102 and shorten the time required for the automatic adjustment. The motor controller 1000c or the motor control method capable of efficiently performing the automatic adjustment in this manner may be provided.

The adjustment management unit 9b may determine the start time of the learning operation L42 on the basis of the completion time of the learning operation L41, and determine the respective start times of the evaluation operation cycle ECYC1 and the evaluation operation cycle ECYC2 on the basis of the start times of the learning operation L41 and the learning operation L42. With this operation, the relationship between the timings to perform two learning operations may be adjusted, and the relationship between the timing at which to perform the learning operation and the timing at which to perform the evaluation operation cycle may be adjusted. Through these, the waiting time may be shortened. The motor controller 1000c or the motor control method capable of efficiently performing the automatic adjustment in this manner may be provided.

The motor controller 1000c further includes the learning time estimation unit 10 that estimates the time required for the learning operation L41, as the estimated learning time. The adjustment management unit 9b may determine in advance an estimated value of the time required to perform the evaluation operation cycle, as the estimated evaluation operation cycle required time. Further, the adjustment management unit 9b may determine to continue the evaluation operation cycle ECYC1 if, at a determination time that is the time at which the evaluation operation cycle ECYC1 has been completed, the difference between the estimated learning time and a period of time that has elapsed from the start time of the learning operation L21 to the determination time is equal to or longer than the estimated evaluation operation cycle required time. The adjustment management unit 9b may determine not to continue the evaluation operation cycle ECYC1 if the difference is shorter than the estimated evaluation operation cycle required time. This operation can increase the number of evaluation operation cycles to the extent that the evaluation operation cycles can be completed by the completion time of the learning time. When the estimated learning time, the estimated evaluation operation cycle required time, or the like changes, the number of evaluation operation cycles to be performed can be adjusted in response to the change, so that the automatic adjustment can be efficiently performed. The motor controller 1000c or the motor control method capable of efficiently performing the automatic adjustment in this manner may be provided.

In the operation example in FIG. 15, the adjustment management unit 9b determines the completion time of the initialization operation IN41 on the basis of the start time of the initialization operation IN41 and the initialization operation required time. The present embodiment is not limited to this operation. For example, there is a case where an intermediate process including one of the initialization operation, the evaluation operation, or the learning operation is performed between the completion of the first process, which is a process, and the start of the second process, which is a process. In this case, the adjustment management unit 9b may estimate, in advance, the time required to perform the intermediate process, and determine that the start time of the second process follows the time at which the estimated time required to perform the intermediate process has elapsed from the completion time of the first process. Through this operation, the start time of the second process may be adjusted with the estimated value of the time required for the intermediate process as a guide, and the waiting time is shortened to thereby reduce the time required for the automatic adjustment. The motor controller 1000c or the motor control method capable of efficiently performing the automatic adjustment in this manner may be provided.

As described above, the present invention can provide the motor controller capable of shortening the time required for the automatic adjustment to adjust the control command to control the motor by repeating the initialization operation, the evaluation operation, and the learning operation when performing the automatic adjustment.

REFERENCE SIGNS LIST 1 motor; 2 command generation unit; 3 mechanical load; 4 drive control unit; 7, 7a, 7b, 7c learning unit; 9, 9a, 9b adjustment management unit; 10 learning time estimation unit; 77 learning limit time determination unit; 101 state sensor signal; 103 command signal; 1000, 1000a, 1000b, 1000c motor controller; 2000 object of control; ECYC1, ECYC2 evaluation operation cycle; EV11, EV12, EV21, EV22, EV41, EV42, EV43, EV44 evaluation operation; IN12, IN22, IN41, IN42, IN43, IN44 initialization operation; L12, L22, L23, L41, L42 learning operation; TLIM1 learning limit time; TSL1 basic learning time.

The invention claimed is:

1. A motor controller comprising:
   drive control circuitry to drive a motor on a basis of a control command, operate a control target including the motor and a mechanical load mechanically connected to the motor, and perform an initialization operation of setting the control target in an initial state and an evaluation operation starting from the initial state;
   learning circuitry to learn the control command used in the evaluation operation and a state sensor signal in association with each other, the state sensor signal having detected a state of the control target at a time of the evaluation operation including at least one of position, velocity, and acceleration of the control target, to provide a result of learning including a reward calculated from the state sensor signal, the reward depending upon a period of time from a start of the evaluation operation until a deviation between a position of the motor when the motor is operated in the evaluation operation and a target travel distance for the motor falls within an allowable range, the reward increasing with a decrease in the period of time, and to determine, on the basis of a result of the learning including the calculated reward, the control command to be used in the evaluation operation to be performed after the evaluation operation in which the state sensor signal has been acquired; and adjustment management circuitry to determine, on the basis of a timing at which to perform a first process, a timing at which to perform a second process, the first process being one of a learning operation, the initialization operation, and the evaluation operation, the learning operation being an operation of the learning circuitry, the second process being one of the learning operation, the initialization operation, and the evaluation operation.

2. The motor controller according to claim 1, wherein the evaluation operation includes a plurality of evaluation operations, a first evaluation operation that is one of the evaluation operations is performed, a first learning operation that is the learning operation is performed using the state sensor signal acquired at a time of the first evaluation operation, a first initialization operation that is the initialization operation is performed in parallel with the first learning operation, and a second evaluation operation that is the evaluation operation subsequent to the first evaluation operation is performed from the initial state determined by the first initialization operation, on the basis of the control command determined in the first learning operation.

3. The motor controller according to claim 2, wherein the adjustment management circuitry detects a completion time of the first evaluation operation, and determines a start time of the first learning operation and a start time of the first initialization operation, on the basis of the detected completion time of the first evaluation operation.

4. The motor controller according to claim 2, wherein the adjustment management circuitry determines that a start time of one of the first learning operation and the first initialization operation, the one operation requiring a longer time, is the same as or precedes a start time of the other.

5. The motor controller according to claim 2, wherein the adjustment management circuitry detects a completion time of one of the first learning operation or the first initialization operation, the one operation being completed at the same time as or later than the other, and determines a start time of the second evaluation operation on the basis of the detected completion time.

6. The motor controller according to claim 2, wherein a time required for the first initialization operation is longer than a time required for the first learning operation, and the motor controller further comprises learning limit time determination circuitry to determine a learning limit time such that a time at which an estimated initialization operation required time has elapsed from a start time of the first initialization operation follows a time at which the learning limit time has elapsed from a start time of the first learning operation, the learning limit time being an upper limit of a learning time that is a period of time during which the learning operation is performed, the estimated initialization operation required time being an estimated value of a time required for the initialization operation, and the learning circuitry performs the first learning operation for a period of time equal to or shorter than the learning limit time.

7. The motor controller according to claim 6, wherein the learning limit time determination circuitry further determines a basic learning time that is a lower limit of the learning time and is a period of time shorter than the learning limit time, and the learning circuitry performs the first learning operation for a period of time equal to or longer than the basic learning time.

8. The motor controller according to claim 1, wherein the learning operation includes a plurality of learning operations, another learning operation that is one of the learning operations is performed, a first evaluation operation cycle that is one of evaluation operation cycles made up of the initialization operation and the evaluation operation is performed a plurality of times in parallel with the another learning operation, a further learning operation that is the learning operation subsequent to the another learning operation is performed using the state sensor signal acquired at a time of the first evaluation operation cycle, and a second evaluation operation cycle that is the evaluation operation cycle subsequent to the first evaluation operation cycle is performed a plurality of times in parallel with the further learning operation, using the control command determined in the another learning operation.

9. The motor controller according to claim 8, wherein the adjustment management circuitry determines a start time of the further learning operation on the basis of a completion time of the another learning operation, and determines start times of the first evaluation operation cycle and the second evaluation operation cycle on the basis of start times of the another learning operation and the further learning operation, respectively.

10. The motor controller according to claim 8, further comprising:

learning time estimation circuitry to estimate a time required for the another learning operation, as an estimated learning time, wherein the adjustment management circuitry sets in advance an estimated value of a time required to perform each evaluation operation cycle as an estimated evaluation operation cycle required time, and the adjustment management circuitry determines to continue the first evaluation operation cycle, at a determination time that is a time at which the first evaluation operation cycle has been completed when a difference between the estimated learning time and a time elapsed from a start time of the another learning operation to the determination time is equal to or longer than the estimated evaluation operation cycle required time, and determines not to continue the first evaluation operation cycle when the difference is shorter than the estimated evaluation operation cycle required time.

11. The motor controller according to claim 1, wherein an intermediate process including at least one of the initialization operation, the evaluation operation, or the learning operation is performed between completion of the first process and start of the second process, and the adjustment management circuitry estimates in advance a time required to perform the intermediate process, and determines that a start time of the second process follows a time at which the estimated time required to perform the intermediate process has elapsed from a completion time of the first process.

12. The motor controller according to claim 1, wherein
the drive control circuitry drives the motor in such a manner that the motor follows a command signal that is a command value to control the motor, the command value being a command value of position, velocity, acceleration, current, torque, or thrust, and the adjustment management circuitry detects a timing at which to perform the evaluation operation or the initialization operation on the basis of the command signal or a detection result of the detection of the state of the control target.

13. The motor controller according to claim 1, wherein the learning operation and the initialization operation are performed in parallel.

14. The motor controller according to claim 1, wherein the learning operation and the initialization at least partially overlap in time.

15. A motor control method comprising:
driving a motor on a basis of a control command, operating a control target including the motor and a mechanical load mechanically connected to the motor, and performing an initialization operation of setting the control target in an initial state and an evaluation operation starting from the initial state;

learning the control command used in the evaluation operation and a state sensor signal in association with each other, the state sensor signal having detected a state of the control target at a time of the evaluation operation including at least one of position, velocity, and acceleration of the control target, providing a result of learning including a reward calculated from the state sensor signal, the reward depending upon a period of time from a start of the evaluation operation until a deviation between a position of the motor when the motor is operated in the evaluation operation and a target travel distance for the motor falls within an allowable range, the reward increasing with a decrease in the period of time, and determining, on the basis of a result of the learning including the calculated reward, the control command to be used in the evaluation operation to be performed after the evaluation operation in which the state sensor signal has been acquired; and determining, on the basis of a timing at which to perform a first process, a timing at which to perform a second process, the first process being one of the learning operation, the initialization operation, and the evaluation operation, the second process being one of the learning operation, the initialization operation, and the evaluation operation.

* * * * *